(12) United States Patent
Loven

(10) Patent No.: US 9,548,698 B2
(45) Date of Patent: Jan. 17, 2017

(54) SOLAR ENERGY COLLECTION SYSTEM EMPLOYING REFLECTORS AND SUN TRACKING

(71) Applicant: University of Scranton, Scranton, PA (US)

(72) Inventor: James Loven, Scranton, PA (US)

(*) Notice: Subject to any disclaimer, the term of this patent is extended or adjusted under 35 U.S.C. 154(b) by 264 days.

(21) Appl. No.: 14/212,015

(22) Filed: Mar. 14, 2014

(65) Prior Publication Data

US 2014/0261629 A1   Sep. 18, 2014

Related U.S. Application Data

(60) Provisional application No. 61/794,343, filed on Mar. 15, 2013.

(51) Int. Cl.
*H01L 31/052* (2014.01)
*H02S 40/22* (2014.01)

(52) U.S. Cl.
CPC ............... *H02S 40/22* (2014.12); *H02S 20/32* (2014.12); *Y02E 10/52* (2013.01)

(58) Field of Classification Search
CPC ...... H01L 31/0525; H02S 20/32; H02S 40/22; Y02E 10/52; G01S 3/786; G01S 3/7861; G01S 3/7862; G01S 3/7865
See application file for complete search history.

(56) References Cited

U.S. PATENT DOCUMENTS

| | | | | |
|---|---|---|---|---|
| 4,010,614 A | * | 3/1977 | Arthur | F03G 6/065 |
| | | | | 126/576 |
| 4,041,307 A | * | 8/1977 | Napoli | F24J 2/38 |
| | | | | 126/578 |
| 4,082,947 A | * | 4/1978 | Haywood | F24J 2/38 |
| | | | | 126/575 |
| 4,147,154 A | * | 4/1979 | Lewandowski | F24J 2/16 |
| | | | | 126/574 |
| 4,179,612 A | * | 12/1979 | Smith | G01S 3/7861 |
| | | | | 126/577 |
| 4,328,417 A | * | 5/1982 | Himes | F24J 2/38 |
| | | | | 136/291 |
| 4,355,896 A | * | 10/1982 | Frosch | G01W 1/00 |
| | | | | 250/203.4 |
| 4,711,998 A | * | 12/1987 | Malek | G01S 3/7861 |
| | | | | 250/206.1 |
| 5,517,358 A | * | 5/1996 | Dominguez | F24J 2/542 |
| | | | | 359/591 |
| 7,378,628 B2 | * | 5/2008 | Maldziunas | B60H 1/0075 |
| | | | | 250/203.4 |
| 7,692,091 B2 | * | 4/2010 | Altaii | F24J 2/38 |
| | | | | 126/577 |
| 2002/0023638 A1 | * | 2/2002 | Buron | F24J 2/38 |
| | | | | 126/601 |
| 2002/0139413 A1 | * | 10/2002 | Sasaki | F24J 2/38 |
| | | | | 136/246 |
| 2009/0032090 A1 | * | 2/2009 | Kats | F24J 2/542 |
| | | | | 136/251 |

(Continued)

*Primary Examiner* — John Lee
(74) *Attorney, Agent, or Firm* — Stradley Ronon Stevens & Young, LLP

(57) ABSTRACT

A solar energy system for collecting and converting solar energy to electricity using photovoltaic devices. The system further includes reflective panels to concentrate incident solar energy onto an array of solar panels, as well as an automated sun tracking system to rotate the solar and reflective panels to follow the sun.

14 Claims, 19 Drawing Sheets

(56) References Cited

U.S. PATENT DOCUMENTS

| | | | | |
|---|---|---|---|---|
| 2009/0260619 A1* | 10/2009 | Bailey | ........................ | F24J 2/07 |
| | | | | 126/578 |
| 2010/0059043 A1* | 3/2010 | Hong | ........................ | F24J 2/38 |
| | | | | 126/573 |
| 2010/0102201 A1* | 4/2010 | Sherman | .................... | F24J 2/38 |
| | | | | 250/203.4 |
| 2010/0193010 A1* | 8/2010 | Wells | .................... | G02B 5/0808 |
| | | | | 136/246 |
| 2010/0294337 A1* | 11/2010 | Sherman | .................... | F24J 2/38 |
| | | | | 136/246 |
| 2011/0163222 A1* | 7/2011 | Moser | ........................ | F24J 2/38 |
| | | | | 250/203.4 |
| 2011/0265784 A1* | 11/2011 | Chang | ........................ | F24J 2/38 |
| | | | | 126/607 |
| 2011/0279918 A1* | 11/2011 | Almogy | .................... | F24J 2/14 |
| | | | | 359/872 |
| 2012/0048340 A1* | 3/2012 | Qadir | ........................ | F24J 2/38 |
| | | | | 136/246 |
| 2012/0103393 A1* | 5/2012 | Wu | ............................ | F24J 2/38 |
| | | | | 136/246 |
| 2014/0014157 A1* | 1/2014 | Lee | ........................ | G01S 3/7861 |
| | | | | 136/246 |
| 2014/0014159 A1* | 1/2014 | Polk | .................... | H01L 31/0522 |
| | | | | 136/246 |
| 2014/0261629 A1* | 9/2014 | Loven | .................... | H02S 20/32 |
| | | | | 136/246 |

* cited by examiner

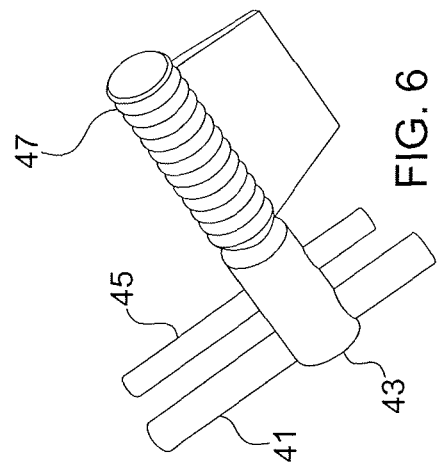
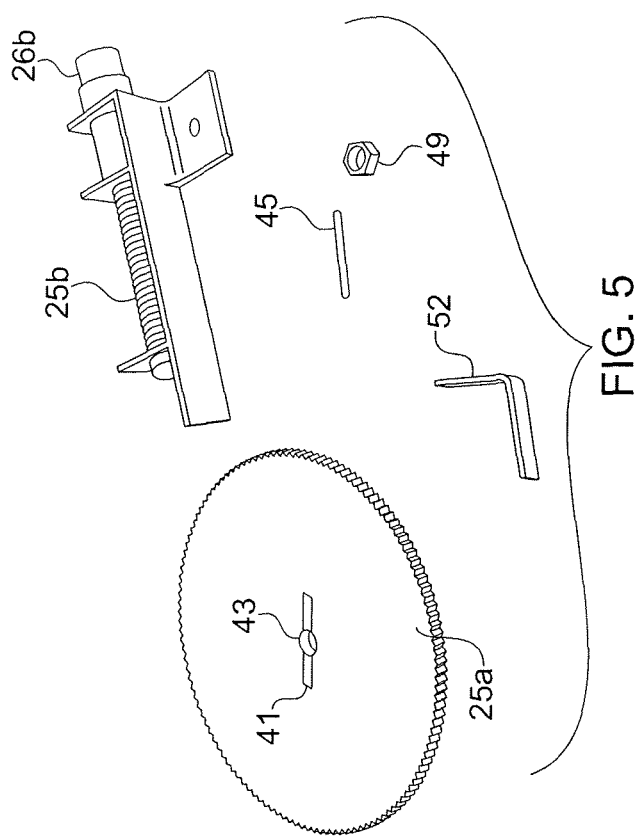

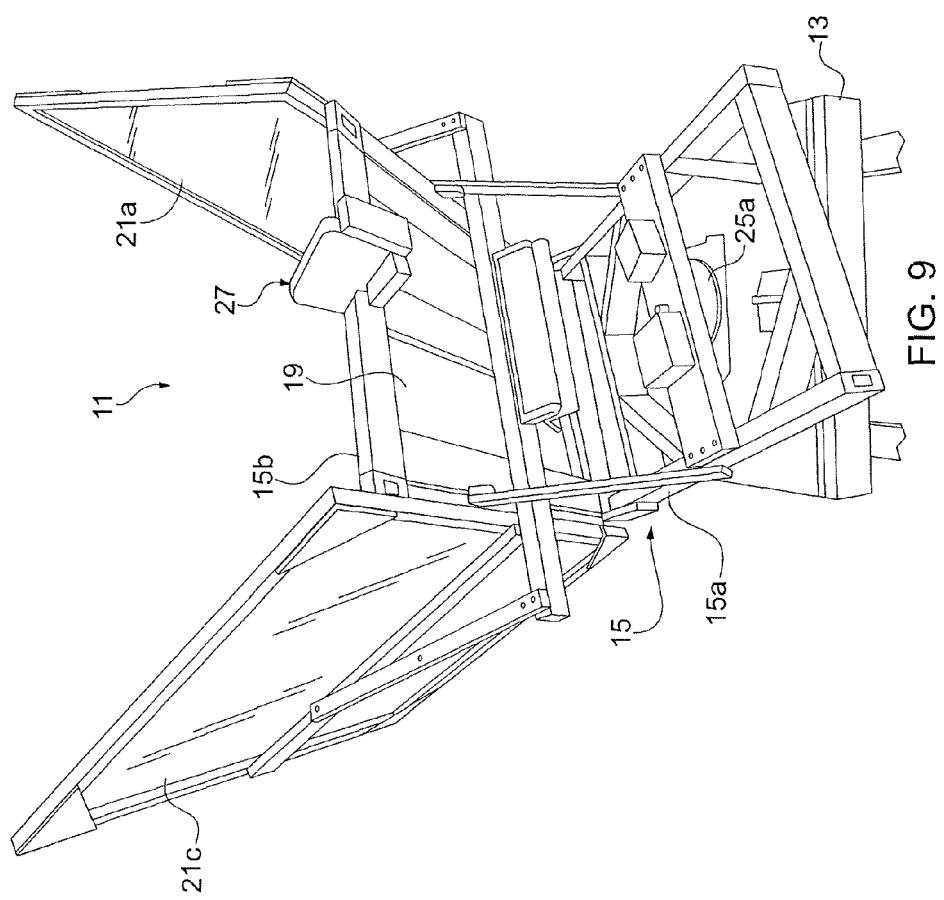

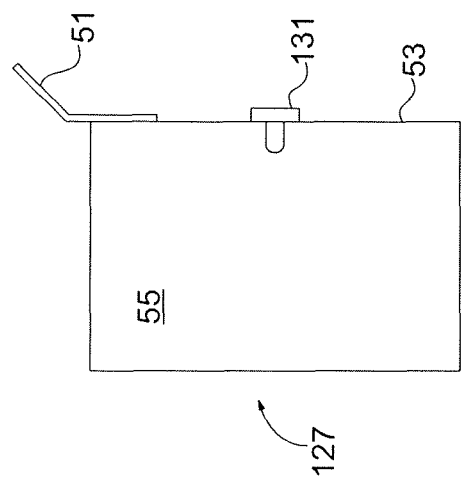
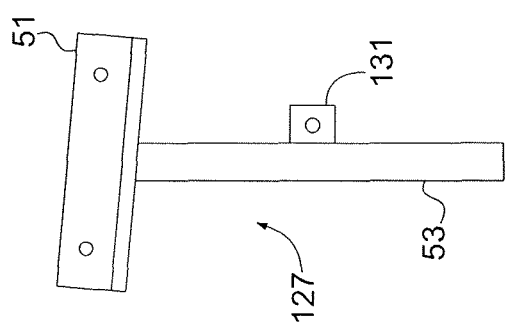

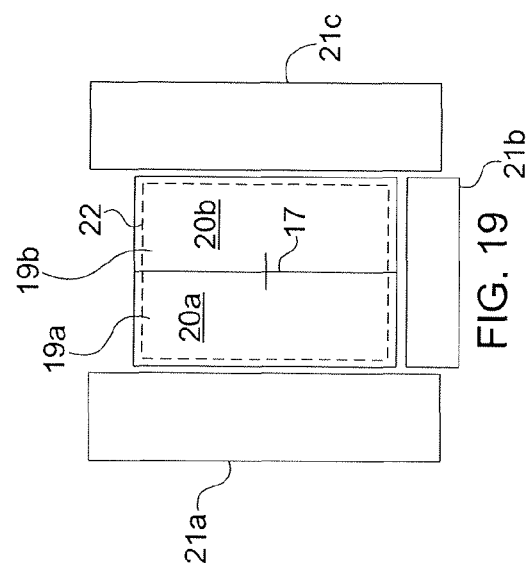
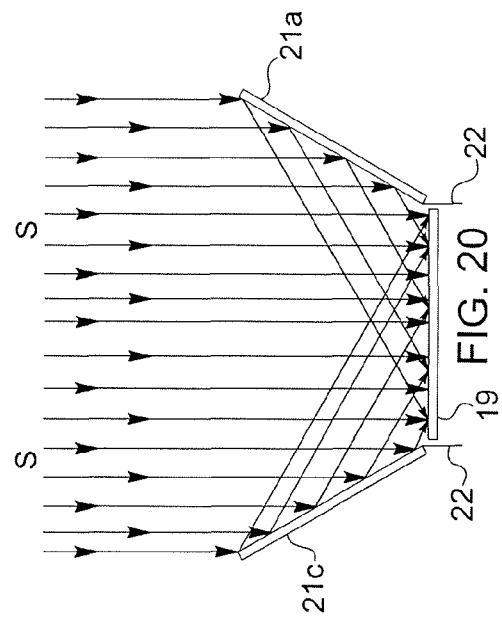
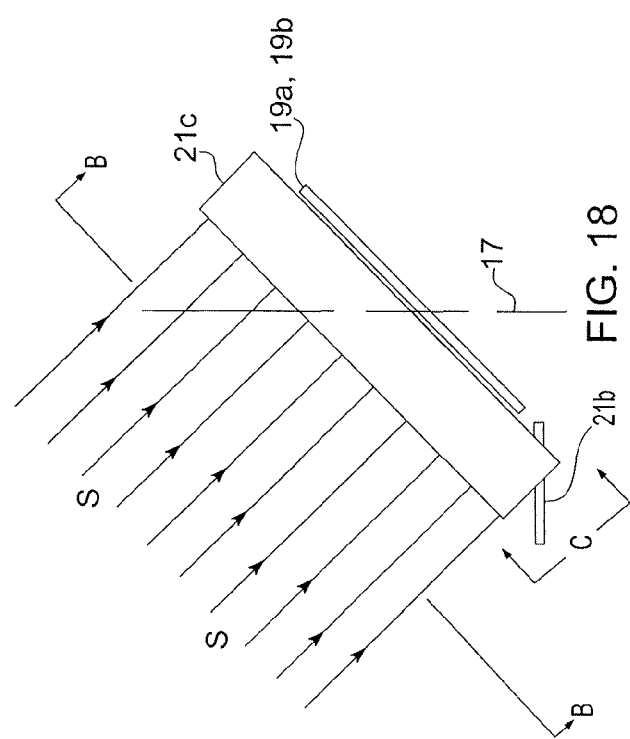

SOLAR ENERGY COLLECTION SYSTEM EMPLOYING REFLECTORS AND SUN TRACKING

RELATED APPLICATION

This application claims the benefit of priority to U.S. Provisional Patent Application Ser. No. 61/794,343, filed on Mar. 15, 2013, the contents of which are incorporated in this application by reference.

TECHNICAL FIELD

The present invention relates generally to a solar energy system for collecting and converting solar energy to electricity. More particularly, the invention relates to a system having photovoltaic devices, and which further includes reflective panels to concentrate incident solar energy onto an array of solar panels, as well as an automated sun tracking system to rotate the solar and reflective panels to follow the sun.

BACKGROUND OF THE INVENTION

Photovoltaic (PV) devices, such as solar panels, are used to collect convert incident radiation from the sun (sunlight) into electricity. Such solar panels generate electricity directly from sunlight semiconductor materials in which electrons are freed by solar energy and can be induced to travel through an electrical circuit. In use, an array of one or more solar panels is typically installed on a roof, or on one or more carriers affixed to the ground or another substrate, to catch as much sunlight as possible.

Maximizing the amount of sunlight impinging on the solar panels maximizes the amount of energy collected and converted to electricity by solar panels. The amount of sunlight that can be collected by solar panels is limited by a number of factors. Generally, each solar panel has a planar sunlight-collecting surface. The total area of the sunlight-collecting surface of a single solar panel, or of the collective sunlight-collecting surfaces of two or more solar panels in an array, is one factor affecting the amount of sunlight which can be collected. Thus, multiple solar panels are often used together to enlarge the total sunlight-collecting surface area, because there are practical limits to how large each panel can be manufactured. When more than one solar panel is used, three solar panels may be positioned with their sunlight-collecting surfaces lying generally in the same plane, facing the same direction.

Another way to increase the amount of sunlight collected by the solar panels is to attach one or more reflector panels at the outer periphery of the sunlight-collecting surfaces of the solar panels to reflect and concentrate incident sunlight on to the sunlight-collecting surfaces. The sunlight thus reflected would otherwise fall outside the periphery of the sunlight-collecting surface area and be lost. Thus, use of one or more reflective panels in addition to the solar panels increases the efficiency of solar energy collection systems.

Maximizing the amount of direct sunlight impinging on the solar panels also maximizes the total amount of energy collected for conversion. "Direct" sunlight means sunlight that impinges on the panel surfaces at a right angle, or as close to a right angle as possible. Direct sunlight carries more energy than indirect sunlight. Thus, other ways of increasing the amount of direct sunlight collected involve properly positioning the solar panels relative to the position of the sun in the sky to maximize the direct sunlight impinging on the solar panels.

For example, the sun appears in the sky at different altitudes (i.e., vertical angle from the horizon or the horizontal plane), rather than always directly overhead, depending on one's latitudinal location on the earth. This means that positioning solar panels flat on the ground would be inefficient in most places on earth. When located in the northern hemisphere such as Europe, North America, Japan, and northern Asia, or in the southern hemisphere such as South Africa, Australia, and southern South America, solar panels are tilted at an appropriate altitude. The altitude is selected based on the location to maximize the amount of direct sunlight that impinges on the sunlight-collecting surfaces of the solar panels throughout the day. In locations closer to the equator such as northern Brazil, Columbia, sub-Saharan Africa. Indonesia, and Singapore, where the sun's daily path across the sky remains at or close to directly overhead, significant tilting is less important and solar panels are typically installed with their surfaces at or nearly parallel with the horizontal plane of the earth. Selecting the altitude at which to orient solar panel arrays addresses differences in the sun's altitude from place to place on earth.

Throughout each day, at any given location on earth, the sun's position will also vary from east to west as it crosses the sky between sunrise and sunset. The position of the sun as it moves across the sky is measured as an angle on the horizontal plane known as azimuth. More specifically, the azimuth of the sun may be defined as the angle, drawn on the horizontal plane, between a fixed reference vector (e.g., a vector pointing due north) and a vector projecting from a given location (e.g., location of the solar panels) and a point of interest (e.g., the sun). In other words, the azimuth of the sun is the horizontal angle measured clockwise from a fixed base direction line such as north.

Historically, solar panel arrays remained in the same position with respect to the azimuth position of the sun, all day and all year round. These "static" arrays are limited in the amount of energy that can be produced in a given day because the arrays are not oriented to directly face the sun as it travels across the sky from sunrise to sunset.

It is an object of the invention to increase the effective amount of area of sunlight impinging on a given array by reflecting sunlight onto the array from areas where sunlight impinges outside of the array. It is another object of the invention to increase the amount of energy produced by a solar array by providing a system that automatically rotates a panel or an array of panels to face the sun as the sun travels from sunrise to sunset, thus increasing the amount of solar energy collected in a solar day.

BRIEF SUMMARY OF THE INVENTION

To achieve these and other objects, and in view of its purposes, the present invention provides an improved solar energy collection system for converting solar energy to electricity. The invention is adapted to track the location of and move with the location of the sun to allow the solar panels to face the sun as the sun changes position in the sky. The invention is further adapted to reflect additional sunlight onto the solar panels, obtaining the benefit of sunlight that would otherwise not impinge on the surface of the solar panels.

The present invention is a solar energy system for collecting and converting solar energy from the sun to electricity, using one or more photovoltaic devices, each of which has a sunlight-collecting surface, and wherein the sun has a varying azimuth position between sunrise and sunset. The system comprises: (a) a base assembly; (b) a carriage assembly; and (c) a sun-tracking device.

More particularly, the base assembly is adapted to be fixed to a substrate and has a vertical axis which extends through the substrate and is normal to the base assembly. The carriage assembly is rotatably connected to the base assembly, and is rotatable about the vertical axis to align the carriage assembly relative to the azimuth position of the sun. Furthermore, the carriage assembly comprises (i) a carriage base structure rotatably attached to the base assembly, and (ii) a support structure attached to the carriage base structure and adapted to support one or more photovoltaic devices.

The sun-tracking device of the solar energy system senses the azimuth position of the sun and rotates the carriage assembly accordingly. The device comprises: (i) an orientation sensor assembly; (ii) a rotation assembly affixed to the base assembly, and (iii) an electric circuit. The orientation sensor assembly (i) includes one or more photovoltaic sensors, each of which receives solar energy from the sun and produces an output voltage based on the sun's azimuth position, and at least one planar feature which is positioned relative to the one or more photovoltaic sensors to at least partially expose or shade at least one of the photovoltaic sensors depending on the azimuth position of the sun. The rotation assembly (ii) includes (a) a motor, and (b) a gear drive in communication with both the motor and the carriage base structure of the carriage assembly. The electric circuit receives the output voltage from each of the one or more photovoltaic sensors, and interprets each output voltage according to a predefined set of conditions and conclusions. Based on the conclusions, the electric circuit signals the motor to engage the gear drive and rotate the carriage assembly in a first direction or a second direction, or neither direction, thereby aligning the carriage assembly relative to the azimuth position of the sun.

In some embodiments of the solar energy system, the sunlight-collecting surfaces of the one or more photovoltaic devices define a sunlight-collecting area having a periphery. In such embodiments, the system may further comprise one or more reflecting panels affixed to the support structure of the carriage assembly proximate to the periphery of the sunlight-collecting area. The reflecting panels reflect sunlight from outside the periphery to impinge on the sunlight-collecting surfaces, without interfering with sunlight impinging on the sunlight-collecting area.

In some embodiments of the solar energy system, the gear drive of the rotation assembly of the sun-tracking device may comprise a worm gear drive. Such a worm gear drive may comprise (i) a disk-shaped toothed gear which is positioned concentrically with the vertical axis of the base assembly, and (ii) a threaded worm screw which is engaged with the toothed gear. Moreover, the toothed gear is connected to both the base assembly and the carriage base structure of the carriage assembly, and the threaded worm screw is in communication with, and rotatable by, the motor of the rotation assembly.

The orientation sensor assembly of the sun-tracking device is attached directly or indirectly to the carriage assembly such that the orientation sensor assembly remains in the same orientation as the carriage assembly with respect to the azimuth position of the sun.

In some embodiments, the orientation sensor assembly has the following configuration. The at least one planar feature comprises (i) a planar table which is affixed to, and extends away from, the support structure of the carriage assembly and has a table surface occupying a first plane, (ii) a shade fin connected to, at a central location of, the table surface of the planar table and extending, in a substantially perpendicular direction, from a point on the table surface nearest the support structure and a rear point on the table surface away from the support structure, whereby the table surface comprises a west-most facing table surface portion and an east-most table surface portion, and (iii) a return shade fin being connected to and extending from the shade fin at the rear point and generally forming an L-shape with the shade fin and, when sunlight travels in a direction from the rear point to the front point, sunlight is prevented from impinging the west-most table surface. In such embodiments, the one or more photovoltaic sensors of the orientation sensor assembly comprise an east-most sensor positioned on the east-most table surface portion of the table surface of the planar table, and a west-most sensor positioned on the west-most table surface portion of the table surface of the planar table. Furthermore, the electric circuit interprets the output voltages of the east-most and west-most photovoltaic sensors and then signals the motor to engage the gear drive to align the carriage assembly relative to the azimuth position of the sun by rotating the carriage assembly according to the following predefined sets of conditions and conclusions.

Set 1: when the output voltage from the east-most sensor on the east-most table surface portion is less than the output voltage from the west-most sensor on the west-most table surface, then the sunlight is less intense on the east-most table surface portion relative to the west-most table surface portion and the electric circuit signals the motor to engage the gear drive and rotate the carriage assembly in a first direction thereby aligning the carriage assembly relative to the azimuth position of the sun;

Set 2: when the output voltage from the west-most sensor on the west-most table surface portion is less than the output voltage from the east-most sensor on the east-most table surface, then the sunlight is less intense on the west-most table surface portion relative to the east-most table surface portion and the electric circuit signals the motor to engage the gear drive and rotate the carriage assembly in a second direction, which is opposite the first direction; and Set 3: when the output voltage from the east-most sensor is substantially equal to the output voltage from the west-most sensor, then the sunlight is equally intense on the east-most and west-most table surface portions and the electric circuit does not signal the motor to engage the gear drive, whereby the carriage assembly is not rotated, until conditions change to match one of Set 1 or Set 2.

In some embodiments of the solar energy system, the photovoltaic sensors of the orientation sensor assembly further comprise a reference sensor which is positioned in a location where the sunlight impinges on the reference sensor free from interference by the planar members or any other feature of the system. In embodiments that include such a reference sensor, the electric circuit interprets the output voltages of the east-most, west-most, and reference sensors and then signals the motor to engage the gear drive to align the carriage assembly relative to the azimuth position of the sun by rotating the carriage assembly according to suitable alternative predefined sets of conditions and conclusions.

An alternative embodiment of the orientation sensor assembly may have a configuration in which the at least one planar feature comprises a planar shade structure having a bottom surface facing the substrate, and the one or more photovoltaic sensors comprises or comprise a photovoltaic sensor affixed to the bottom surface of the planar shade structure.

The electric circuit used with such an alternative embodiment of the orientation sensor assembly interprets the output voltage of the photovoltaic sensor, which varies with sunlight conditions, and then signals the motor to engage the gear drive to align the carriage assembly relative to the azimuth position of the sun by rotating the carriage assembly according to the following predefined sets of conditions and conclusions.

When the output voltage from the photovoltaic sensor falls to a value less than 0.1 volt, the electric circuit signals the motor to engage the gear drive and rotate the carriage assembly in a counterclockwise direction until the carriage assembly is in its due east position.

When the output voltage is equal to or greater than a predetermined daylight value, the electric circuit signals the motor to engage the gear drive and rotate the carriage assembly in a clockwise direction until the output voltage falls below the predetermined daylight value.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 5 is a perspective view of the various components of another worm gear drive and motor useful with some embodiments of the invention;

FIG. 6 is an enlarged partial view, from the rear, of the worm gear drive constructed using the components shown in FIG. 5;

FIG. 9 is a rear perspective view of the invention shown in FIGS. 1 and 2, and also including photovoltaic devices;

FIG. 13A is a schematic top plan view of another embodiment of the orientation sensor assembly used with the invention and which has one planar feature and one photovoltaic sensor;

FIG. 13B is a schematic side view of the orientation sensor assembly shown in FIG. 13A;

FIG. 18 is a schematic side view of the support structure, photovoltaic devices, and reflector panels shown in FIG. 17 and showing direct sunlight impinging on the photovoltaic panels;

FIG. 19 is a schematic front view of the support structure, photovoltaic devices, and reflector panels shown in FIG. 17 and showing the relative positions of these features;

FIG. 20 is a schematic bottom view of the support structure, photovoltaic devices, and reflector panels shown in FIG. 17 and showing direct sunlight impinging on the photovoltaic panels and being reflected by the reflector panels;

DETAILED DESCRIPTION OF THE INVENTION

Figure 1:
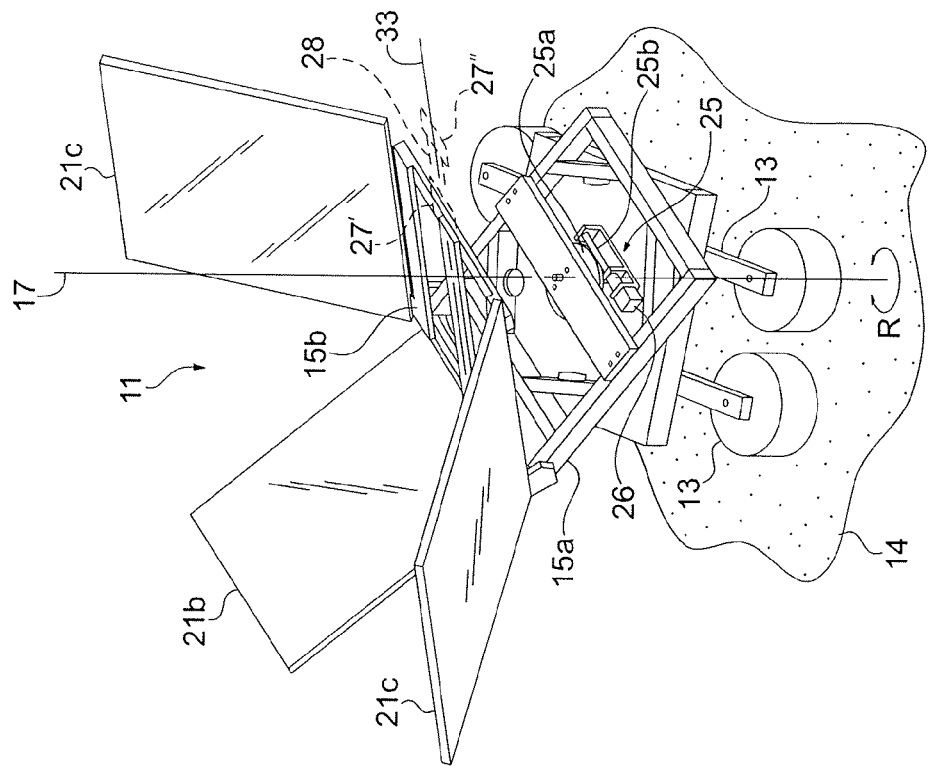
FIG. 1 is an isometric side view of one embodiment of the solar energy system of the invention, without photovoltaic panels installed.
Figure 2:
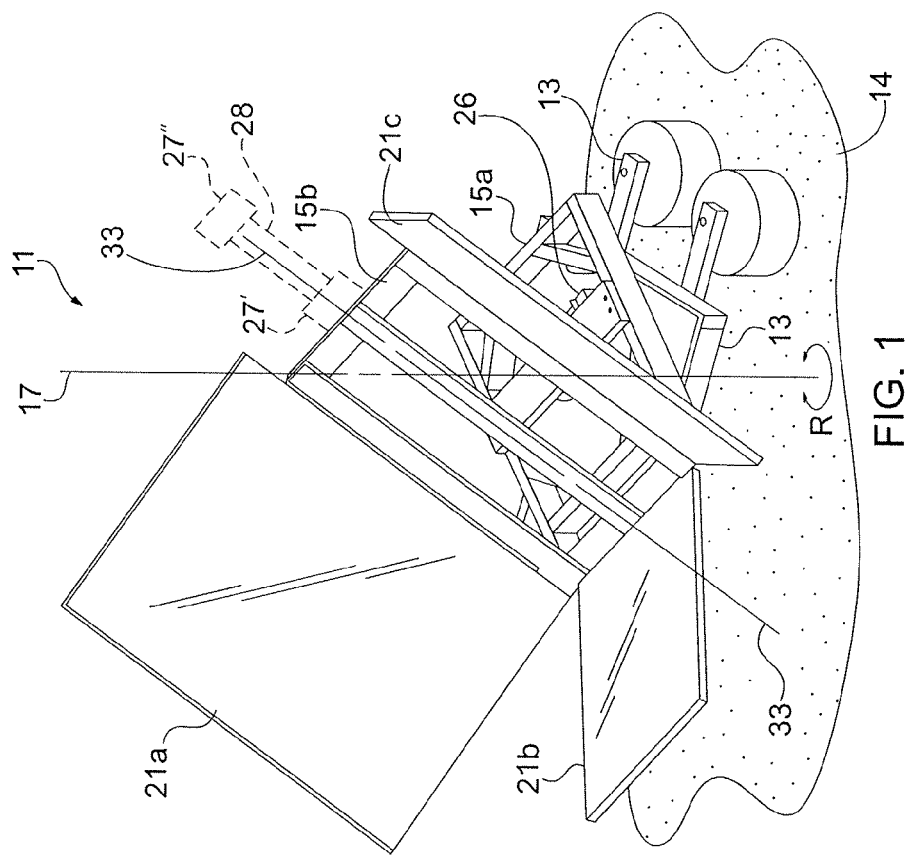
FIG. 2 is an isometric back view of the embodiment of the solar energy system shown in FIG. 1.

Referring now to the drawing, in which like reference numbers refer to like elements throughout the various figures that comprise the drawing, FIGS. 1 and 2 show a solar energy system 11 for collecting solar energy and converting the solar energy to electricity using one or more photovoltaic devices, such as solar panels. More particularly, the solar energy system 11 includes a device which senses the azimuth position of the sun as the sun moves across the sky each day and moves the photovoltaic devices so they remain facing the sun as it moves. This tracking of the sun increases the amount of direct sunlight that impinges on the sunlight-collecting surfaces of the photovoltaic devices which increases the amount of solar energy collected and the efficiency of the solar energy system overall. The system 11 may also include one or more reflectors which reflect additional sunlight onto the solar panels, obtaining the benefit of sunlight that would otherwise not impinge on the surface of the photovoltaic devices.

With reference to FIGS. 1 and 2, the solar energy system 11 of the present invention is shown isometrically from the side (FIG. 1) and from the back (FIG. 2). The solar energy system 11 has a base assembly 13 adapted to be affixed to a substrate 14, such as the gravel-covered ground 14 shown in the FIGS. 1 and 2. As known to persons of ordinary skill in the art, solar energy systems such as system 11 may be installed on, or affixed to, any suitable stationary substrate 14 including, but not limited to, a roof, a pole, a tree, a natural hill or rise, a man-made platform, and the like. The base assembly 13 remains substantially stationary relative to the substrate 14 and has a vertical axis 33 which extends through the base assembly 13 and is generally normal to the base assembly 13.

The solar energy system 11 further comprises a carriage assembly 15 rotatably connected to the base assembly 13 and which is rotatable about the vertical axis 33 to align the carriage assembly 15 relative to the azimuth position of the sun (not shown per se). The carriage assembly 15 comprises a carriage base structure 15a rotatably attached to the base assembly 13, and a support structure 15b attached to the carriage base structure 15a and adapted to support one or more photovoltaic devices (not shown). The carriage base structure 15a generally lies in a plane parallel to the base assembly 13 to facilitate unobstructed rotation, in the direction shown by arrow R in FIGS. 1 and 2, of these features relative to one another during operation of the solar energy system 11.

Figure 17:
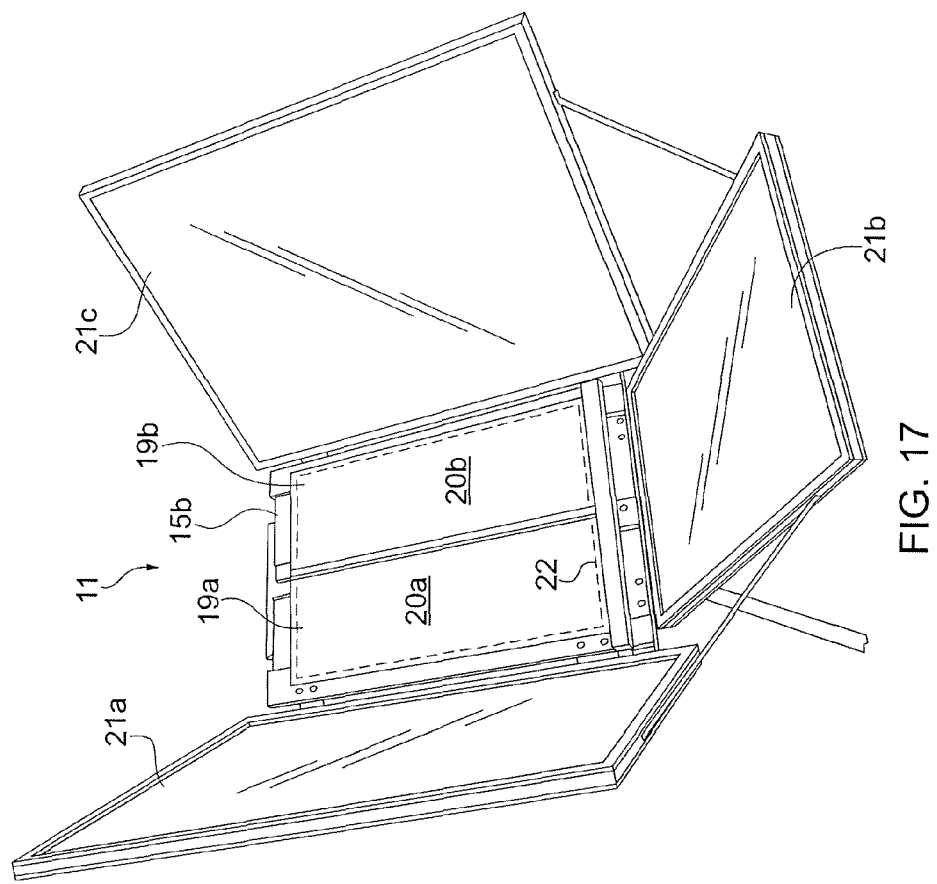
FIG. 17 is a schematic front perspective view of a support structure on which photovoltaic devices are supported and to which reflector panels are affixed in accordance with some embodiments of the invention.

Clarification of the position of one or more photovoltaic devices is provided by FIG. 17, which shows two photovoltaic devices 19a, 19b installed on the support structure 15b of the carriage assembly 15. FIG. 17 is discussed in detail below in connection with an explanation of reflectors 21a, 21b, 21c and their use to increase the sunlight reaching the photovoltaic devices 19a, 19b. Suitable photovoltaic devices 19a, 19b include any of those known now or in the future to persons of ordinary skill in the art and which are capable of absorbing sunlight and converting the energy from the sunlight into electricity. Each photovoltaic device 19a, 19b has a sunlight-collecting surface 20a, 20b, respectively, which should be oriented facing the sun. The sunlight-collecting surfaces 20a, 20b of the photovoltaic devices 19a, 19b are often planar or parabolic, but other shapes are possible. FIG. 17 shows planar sunlight-collecting surfaces 20a, 20b. Photovoltaic devices 19a, 19b are omitted from FIGS. 1 and 2 in order to provide a clearer view of the various other components of the solar energy system 11.

With reference back to FIGS. 1 and 2, the solar energy system 11 further comprises a sun-tracking device having multiple components. Among those components are an orientation sensor assembly 27 (see FIG. 9) which senses the azimuth position of the sun, a rotation assembly 23 which rotates the carriage assembly 15 relative to the base assembly 13 and substrate 14 according to the sensed azimuth position of the sun, and one or more electric circuits 35, 135, 235 (not shown per se in FIGS. 1 and 2, but see FIGS. 12, 15, and 16 and the associated descriptions for details of the electric circuits) which are in communication with the orientation sensor assembly 27 and the rotation assembly 23. Thus, as used below, the sun-tracking device refers, collectively, to the orientation sensor assembly 27, the rotation assembly 23, and the electric circuits 35, 135, 235 which communicate between them.

More particularly, the orientation sensor assembly 27 is shown in phantom schematically in FIGS. 1 and 2 to demonstrate that there are various suitable locations for the orientation sensor assembly 27', 27". For example, the orientation sensor assembly 27', 27" may be attached to the carriage assembly 15 either directly (27') or indirectly (27"), such as at the distal end of a pole 28 which is itself attached directly to the carriage assembly 15. Generally, the orientation sensor assembly 27 is optimally mounted onto the carriage assembly 15 so that it will remain in the same orientation as the carriage assembly 15 with respect to the azimuth position of the sun. In addition, the orientation sensor assembly 27 should be installed in a position where sunlight reaches it without interference from other features of the system 11.

As will be described in further detail below in connection with particular embodiments shown in FIGS. 9-11 and 13A-13B, an orientation sensor assembly 27, 127 suitable for use in connection with the solar energy system 11 generally comprises one or more photovoltaic sensors and at least one planar feature. Each photovoltaic sensor receives sunlight and produces an output voltage which is based on the amount of sunlight received which is, in turn, based on the sun's azimuth position. One or more planar features are positioned relative to the one or more photovoltaic sensors to at least partially expose or shade at least one of the photovoltaic sensors, depending on the azimuth position of the sun.

Figure 8:
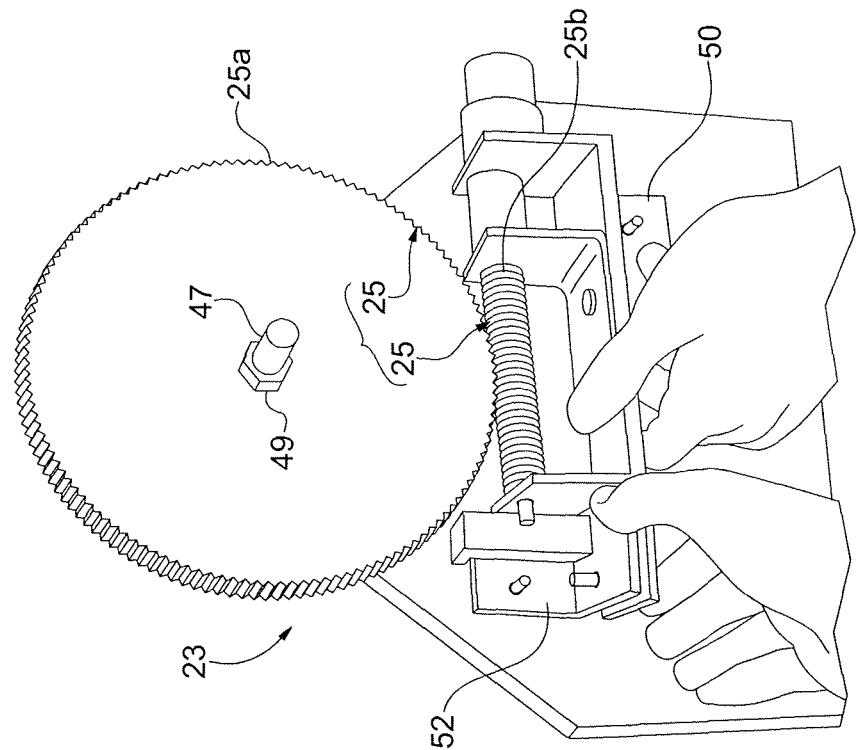
FIG. 8 is another perspective front view of the worm gear drive and motor of FIG. 6.
Figure 7:
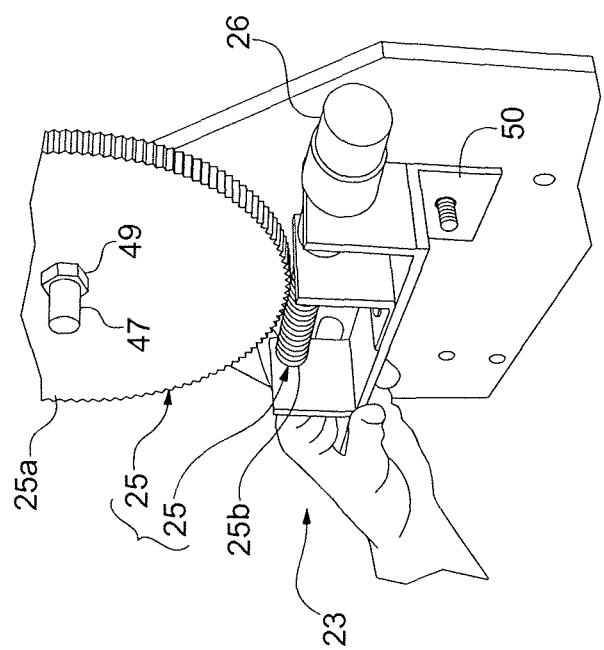
FIG. 7 is a perspective front view of the worm gear drive and motor of FIG. 5.

As shown in FIGS. 1 and 2, the rotation assembly 23 of the sun-tracking device comprises a motor 26 and a gear drive 25 (more clearly seen in FIG. 2, but see also FIGS. 7 and 8). The motor 26 is mounted to base assembly 13 and is in communication with the gear drive 25. Alternatively, the motor 26 may be mounted to the carriage base structure 15a of the carriage assembly 15. The gear drive 25 is in communication with the motor 26 as well as each of the base and carriage assemblies 13, 15. The gear drive 25 may be any suitable gear drive known to persons of ordinary skill in the art including, but not limited to, a spur gear drive, a helical gear drive, and a worm gear drive. The smaller and simpler the gear drive 25 is, the more suitable it is for use in the solar energy system 11.

Figure 4:
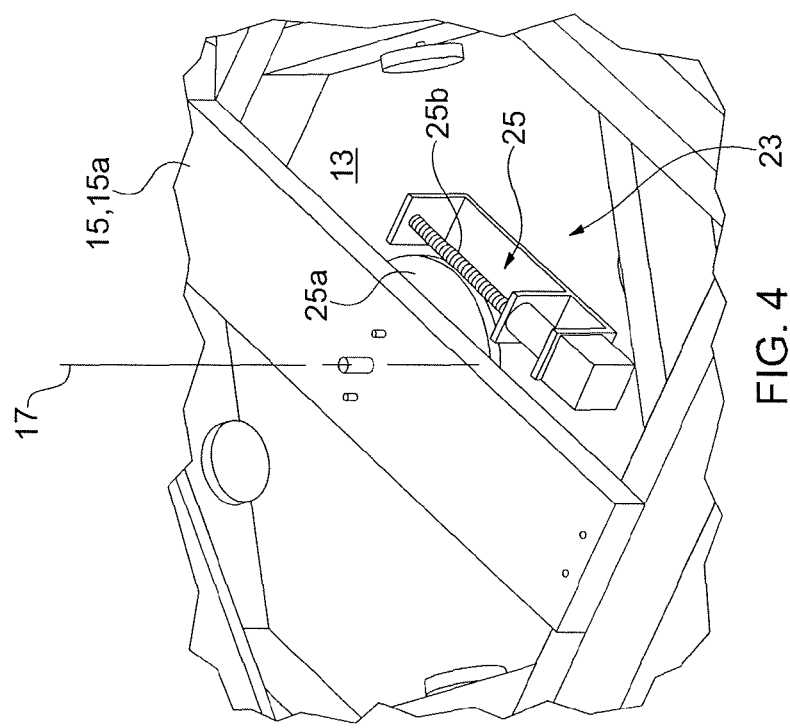
FIG. 4 is another enlarged partial perspective view of the worm gear drive shown in FIG. 3, also showing the motor.
Figure 3:
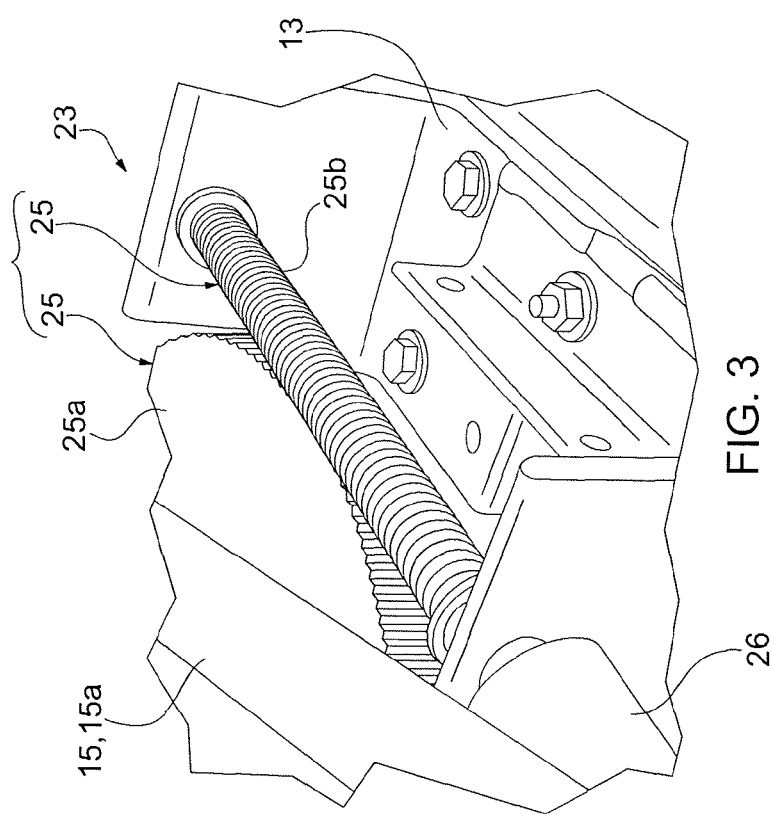
FIG. 3 is an enlarged partial perspective view of a worm gear drive used in the embodiment of the invention shown in FIGS. 1 and 2.

With reference now to FIGS. 3-8, an embodiment of the present invention is shown in which the gear drive 25 comprises a worm gear drive having: (i) a disk-shaped toothed gear 25a which is positioned concentrically with respect to the vertical axis 17 (see FIG. 4) of the base assembly 13, and (ii) a threaded worm screw 25b which is engaged and cooperates with the toothed gear 25a. As shown in FIGS. 3 and 4, in one embodiment, the toothed gear 25a is centered about the vertical axis 17 and connected to both the base assembly 13 and the carriage base structure 15a of the carriage assembly 15. The threaded worm screw 25b is in communication with, and rotatable by, the motor 26 of the rotation assembly 23. Because the worm screw 25b is in mechanical cooperation with the toothed gear 25a operationally fixed to the carriage assembly 15, when the motor 26 engages and rotates the worm screw 25b, the resulting operation of the gear drive 25 also causes the carriage assembly 15 to rotate about the vertical axis 17 relative to the base assembly 13.

Although persons of ordinary skill in the art will understand generally how to construct and install a suitable worm gear drive 25, the following description and FIGS. 5-8 provide a more detailed explanation of how to construct and install a worm gear drive 25 suitable for use in connection with a preferred embodiment of the present invention. As shown in FIGS. 5 and 6, there is a slot 41 milled into the face of the toothed gear 25a, extending radially from the center axle hole 43 outwards in the opposite direction, sized to receive an axle pin 45. The toothed gear 25a slides over the bottom axle 47, as shown in FIGS. 7 and 8, until axle pin 45 is engaged in the slot 41 (not shown). The toothed gear 25a is retained on the bottom axle 47 by a nut 49. The threaded worm screw 25b and motor 26 are bolted, together as a unit, to a bottom end block 50 affixed to the base assembly 13 (not shown), at which point it is pivotable to provide a way to force its secure engagement with the toothed gear 25a. The threaded worm screw 25b and motor 26 are then secured by installation of a mounting bracket 52, as shown in FIGS. 7 and 8. This installation procedure allows for proper self aligning the worm screw-gear engagement which is important for continuous and uninterrupted rotation of the carriage assembly 15 of the solar energy system 11. Selection of suitable materials of construction for the toothed gear 25a and threaded worm screw 25b is within the ability of persons having ordinary skill in the art. For example, without limitation, in one embodiment, the toothed gear 25a may be constructed of UHMW which is an ultra high molecular weight polyethylene plastic, which is economical, impact-resistant, self-lubricating and commercially available, for example, from US Plastics Corp. of Lima, Ohio, U.S.A.

As mentioned above, and with reference briefly to FIGS. 12, 15, and 16, which will be discussed in further detail below in connection with particular embodiments of the present invention, the sun-tracking device further comprises an electric circuit 35, 135, 235, respectively, which receives the output voltage from each of the one or more photovoltaic sensors of the orientation sensor assembly 27, 127, then interprets each output voltage according to a predefined set of conditions and conclusions and, based on the conclusions, operates the rotation assembly 23 by signaling the motor 26 to engage the gear drive 25 and rotate the carriage assembly 15 in a first direction, or a second direction, or neither direction, thereby aligning the carriage assembly 15 relative to the azimuth position of the sun. As will be recognized and practicable by persons of ordinary skill in the relevant art, the particular type and configuration of the electric circuit 35, 135, 235 employed will depend upon the type and configuration of the orientation sensor assembly 27, as described in further detail below.

FIG. 9 provides an isometric view of the solar energy system 11 from the rear, and shows the orientation sensor assembly 27 mounted directly to the support structure 15b of the carriage assembly 15. Only a portion of the photovoltaic device 19 is visible in FIG. 9 and, because the system 11 is viewed from the back, its sunlight-collecting surface is not visible at all.

Figure 11:
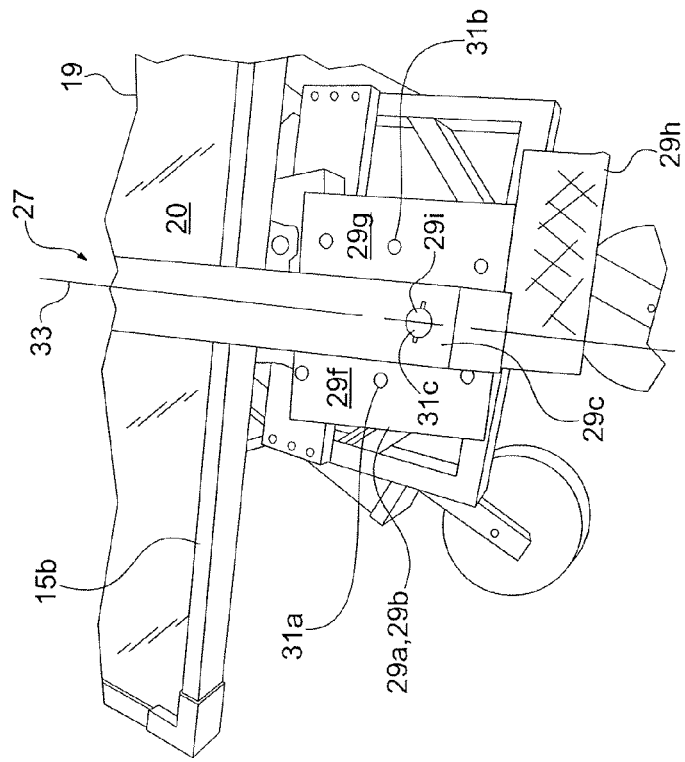
FIG. 11 is an enlarged perspective top view of the orientation sensor assembly shown in FIG. 10.
Figure 10:
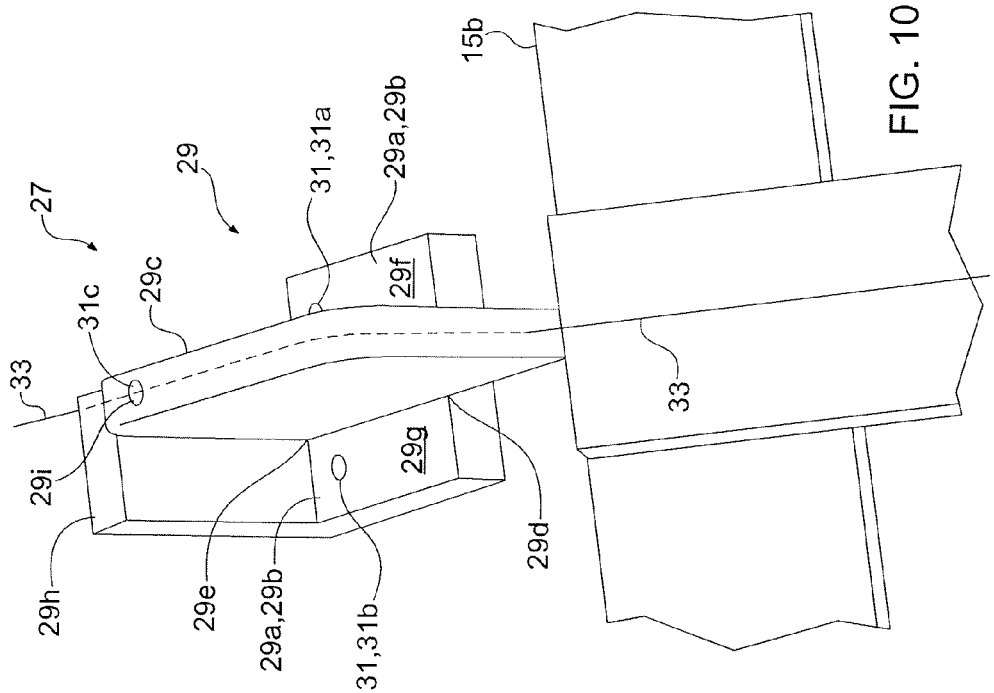
FIG. 10 is an enlarged perspective front view of one embodiment of the orientation sensor assembly used with the invention and which has multiple planar features and multiple photovoltaic sensors.

With reference particularly to FIGS. 9, 10, and 11, this embodiment of the orientation sensor assembly 27 comprises a planar table 29, a shade fin 29c, and a return shade fin 29h, as well as an east-most photovoltaic sensor 31a and a west-most photovoltaic sensor 31b, arranged as follows. The planar table 29 extends away from the support structure 15b of the carriage assembly 15 and has a table surface 29a occupying a first plane 29b. The shade fin 29c is connected to, and at a central location of, the table surface 29a of the planar table 29 and extends, in a substantially perpendicular direction, from a front point 29d on the table surface nearest the support structure 15b and a rear point 29e on the table surface 29a away from the support structure 15b, whereby the table surface 29a comprises a west-most facing table surface portion 29g and an east-most table surface portion 29f. The return shade fin 29h is connected to and extends from the shade fin 29c at the rear point 29e and generally forms an L-shape with the shade fin 29c and, when sunlight travels in a direction from the rear point 29e to the front point 29d, sunlight is prevented from impinging the west-most table surface.

As also shown most clearly in FIGS. 10 and 11, the east-most sensor 31a is positioned on the east-most table surface portion 29f and the west-most sensor 31b is positioned on the west-most table surface portion 29g. Each of the east-most and west-most sensors 31a, 31b, respectively, is adapted to sense light intensity and provide a relatable signal (i.e., an output voltage or V(O)) that is read by an appropriate electric circuit 35 such as the one shown in FIG. 12. When sunlight approaches the orientation sensor assembly 27 from an eastern direction, the west-most sensor 31b is at least partly shaded by the shade fin 29c and when sunlight approaches the orientation sensor assembly 27 from a western direction, the east-most sensor 31a is at least partly shaded by the shade fin 29c. Operating analogously to the principle of a sundial, the orientation sensor device 27 uses the sensing of sun and shade (e.g., cast onto the table surface 29g by the alignment of the shade fin 29c relative to the sun) to identify the position of the carriage assembly 15 and photovoltaic devices 19 relative to the location of the sun and to determine whether the carriage assembly 15 needs to be rotated to more closely align with the azimuth position of the sun.

The return shade fin 29h is oriented relative the table surface 29a and the shade fin 29c such that light is prevented from being cast on the west-most table surface 29f when sunlight travels in a direction from the rear point 29e to the front point 29d. Sunlight will travel generally in this direction onto the orientation sensor device 27 at sunrise in the morning. This morning sunrise condition is where the carriage assembly 15 has been rotated to (i.e., its "sunset position") the prior evening by the sun-tracking system, based on the position of the sun at sunset; therefore, to face the coming morning sun, the carriage assembly 15 must be rotated back to a sunrise position. The return shade fin 29h is used to shade the west-most photo sensor 31b at the west-most table surface 29f from morning sunlight, thereby causing the carriage assembly 15 to be rotated such that the photovoltaic devices 19 and their sunlight-collecting surfaces 20 (as well as the reflector panels 21a, 21b, 21c) face the morning sun.

The orientation sensor 27 is positioned such that the shade fin 29c is oriented such that the plane of the shade planar table 29 approximately bisects a vertical midline 33 of the support structure 15b. This orientation assures that the sunlight sensed by the orientation sensor 27 can be related to the sunlight being cast onto the photovoltaic devices 19 and reflector panels 21a, 21b, 21c.

Figure 12:
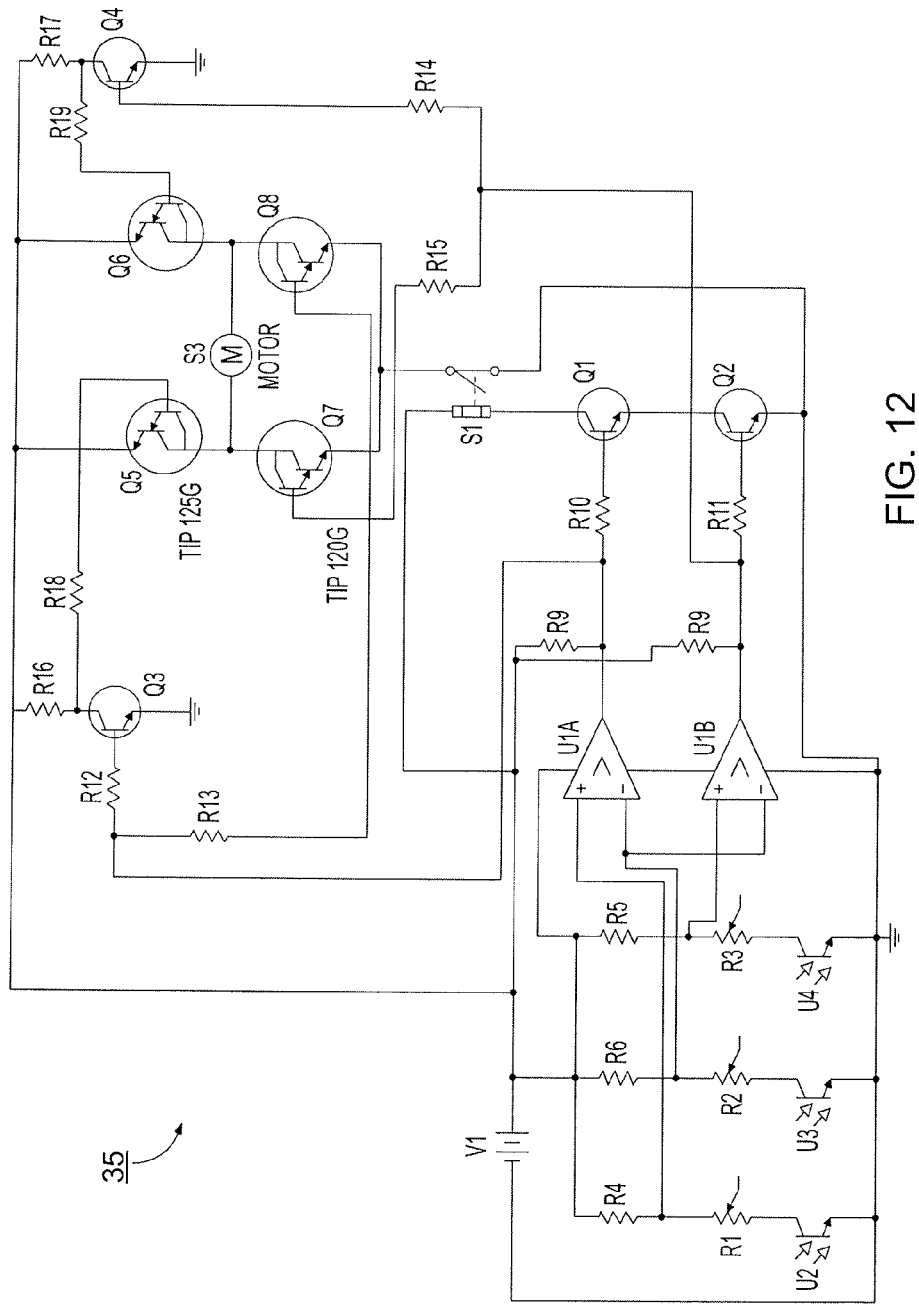
FIG. 12 is a schematic representation of an electric circuit which communicates between the orientation sensor assembly and rotating assembly of the sun-tracking device used with the invention.

FIG. 12 illustrates a preferred embodiment of the electric circuit 35 adapted to cooperate with the orientation sensor assembly 27 of the embodiment shown in FIGS. 9-11 and described above, to communicate with the rotation assembly 23 and rotate the carriage assembly 15 such that the photovoltaic devices 19 face the sun as the sun changes azimuth position in the sky through the day. Generally, as described in detail above, when sunlight impinges on the orientation sensor assembly 27, the orientation sensor assembly 27 senses the position of the sun and of one or more photovoltaic devices 19 supported on the carriage assembly 15, using the photovoltaic sensors 31a, 31b. More particularly, each of the photovoltaic sensors 31a, 31b receives sunlight and produces an output voltage in proportion to the amount of sunlight received, which depends on their positions relative to the sun, the shade fin 29c, and the return shade fin 29h. The electric circuit 35 receives output voltages from the photovoltaic sensors 31a, 31b, interprets that information, and operates to selectively drive the carriage assembly 15, via the motor 26 turning the gear drive 25, in a first or second direction (see directional arrow R in FIGS. 1 and 2) to allow the one or more photovoltaic devices 19 to optimally face the sun to receive sunlight as the sun's azimuth position changes from sunrise to sunset.

In operation, the electric circuit 35 interprets the output voltages of the east-most and west-most sensors 31a, 31b and then signals the motor 26 to engage the gear drive 25 to align the carriage assembly 15 relative to the azimuth position of the sun by rotating the carriage assembly 15 according to the following predefined sets of conditions and conclusions.

When the output voltage from the east-most sensor 31a on the east-most table surface portion 29f is less than the output voltage from the west-most sensor 31b on the west-most table surface portion 29g, then the sunlight is less intense on the east-most table surface portion 29f relative to the west-most table surface portion 29g and the electric circuit 35 signals the motor 26 to engage the gear drive 25 and rotate the carriage assembly 15 in a first direction thereby aligning the carriage assembly 15 relative to the azimuth position of the sun (Set 1).

When the output voltage from the west-most sensor 31b on the west-most table surface portion 29g is less than the output voltage from the east-most sensor 31a on the east-most table surface portion 29f, then the sunlight is less intense on the west-most table surface portion 29g relative to the east-most table surface portion 29f and the electric circuit 35 signals the motor 26 to engage the gear drive 25 and rotate the carriage assembly 15 in a second direction, which is opposite the first direction (Set 2).

When the output voltage from the east-most sensor 31a is substantially equal to the output voltage from the west-most sensor 31b, then the sunlight is equally intense on the east-most and west-most table surface portions 29f, 29g and the electric circuit 35 does not signal the motor 26 to engage the gear drive 25, whereby the carriage assembly 15 is not rotated, until conditions change to match those of either Set 1 or Set 2 (Set 3).

In another embodiment, the orientation sensor assembly 27 may further include an optional reference sensor 31c which should be positioned in a reference location 29i where the sunlight impinges the reference sensor 31c free from interference by the planar members 29a, 29c, 29h or any other feature of the system 11. In other words, the reference location 29i is a position that will not be shaded from sunlight by either the shade fin 29c or the return shade fin 29h. In this alternate embodiment, the electric circuit 35 interprets the output voltages of all of the east-most, west-most, and reference sensors 31a, 31b, 31c and then signals the motor 26 to engage the gear drive 25 to align the carriage assembly 15 relative to the azimuth position of the sun by rotating the carriage assembly 15 according to the following predefined sets of conditions and conclusions.

When the output voltage from the east-most sensor 31a on the east-most table surface portion 29f is less than the output voltage from the reference sensor 31c, then the sunlight is less intense on the east-most table surface portion 29f relative to the west-most table surface portion 29g and the electric circuit 35 signals the motor 26 to engage the gear drive 25 and rotate the carriage assembly 15 in a first direction thereby aligning the carriage assembly 15 relative to the azimuth position of the sun (Set 4).

When the output voltage from the west-most sensor 31b on the west-most table surface portion 29g is less than the output voltage from the reference sensor 31c, then the sunlight is less intense on the west-most table surface portion 29g relative to the east-most table surface portion 29f and the electric circuit 35 signals the motor 26 to engage the gear drive 25 and rotate the carriage assembly 15 in a second direction, which is opposite the first direction (Set 5).

When the output voltage from both the east-most sensor 31a and the west-most sensor 31b are substantially equal to the output voltage from the reference sensor 31c, then the sunlight is equally intense on the east-most and west-most table surface portions 29f, 29g and the electric circuit 35 does not signal the motor 26 to engage the gear drive 25, whereby the carriage assembly 15 is not rotated until conditions change to match those of either Set 4 or Set 5 (Set 6).

With reference to FIGS. 13A and 13B, another embodiment of the orientation sensor assembly 127 of the sun-tracking device is shown from the top view and a right side view, respectively. This orientation sensor assembly 127 may be mounted or affixed to the carriage assembly 15 in any one of various possible positions as discussed above in connection with the orientation sensor assemblies 27, 27', 27" shown in FIGS. 1, 2, and 9. As shown in FIGS. 13A and 13B, this embodiment of the orientation sensor 127 further comprises an adjustable mounting tab 51 which adjustably attaches the orientation sensor assembly 127 to the carriage assembly 15, directly or indirectly, as with the orientation sensor assemblies 27, 27', 27" shown in FIGS. 1, 2, and 9.

This embodiment of the orientation sensor assembly 127 differs from the previously described orientation sensor assemblies 27, 27', 27" in that the at least one planar feature comprises a planar shade structure 53 having a bottom surface 55 facing the substrate 14 and to which the adjustable mounting tab 51 is attached. In addition, the one or more photovoltaic sensors of this orientation sensor assembly 127 comprise a photovoltaic sensor 131 affixed to the bottom surface 55 of the planar shade structure 53. Optionally, the bottom surface 55 of the planar shade structure 53 may be reflective.

Figure 14B:
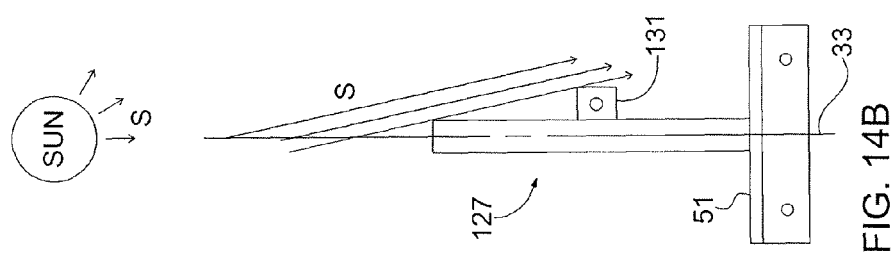
FIG. 14B is a schematic diagram showing how indirect sunlight impinges on the orientation sensor assembly of FIGS. 13A and 13B and leaves the photovoltaic sensor in shade.
Figure 14A:
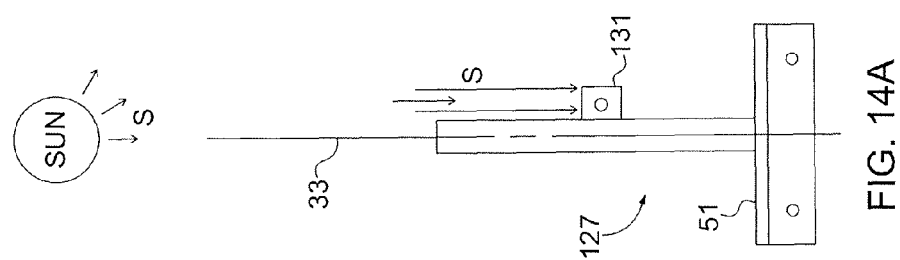
FIG. 14A is a schematic diagram showing how direct sunlight impinges on the photovoltaic sensor of the orientation sensor assembly shown in FIGS. 13A and 13B.

As shown in FIGS. 14A and 14B, when the orientation sensor assembly 127 is mounted to the carriage assembly 15 properly, i.e., in a position wherein the planar shade structure 53 extends perpendicularly away from the carriage assembly 15 along a vertical midline 33 thereof (see, e.g., FIGS. 10 and 11), when direct sunlight S impinges on the photovoltaic devices (not shown, but see FIG. 11) supported on the support structure 15b of the carriage assembly 15, then direct sunlight S will also impinge on the photovoltaic sensor 131. When direct sunlight impinges S on the photovoltaic sensor 131, the photovoltaic sensor 131 receives the maximum amount of solar energy and the carriage assembly 15 need not be moved. Similarly, when the orientation sensor assembly 127 is properly mounted as described above, and the sunlight S is not directly impinging on the photovoltaic devices (not shown) on the carriage assembly 15, then the photovoltaic sensor 131 will be at least partially shaded by the planar shade structure 53 and the photovoltaic sensor 131 (and the photovoltaic devices) will receive less than the maximum amount of solar energy and the carriage assembly 15 will be moved by the rotation assembly 23, as signaled by a suitable electric circuit.

Figure 15:
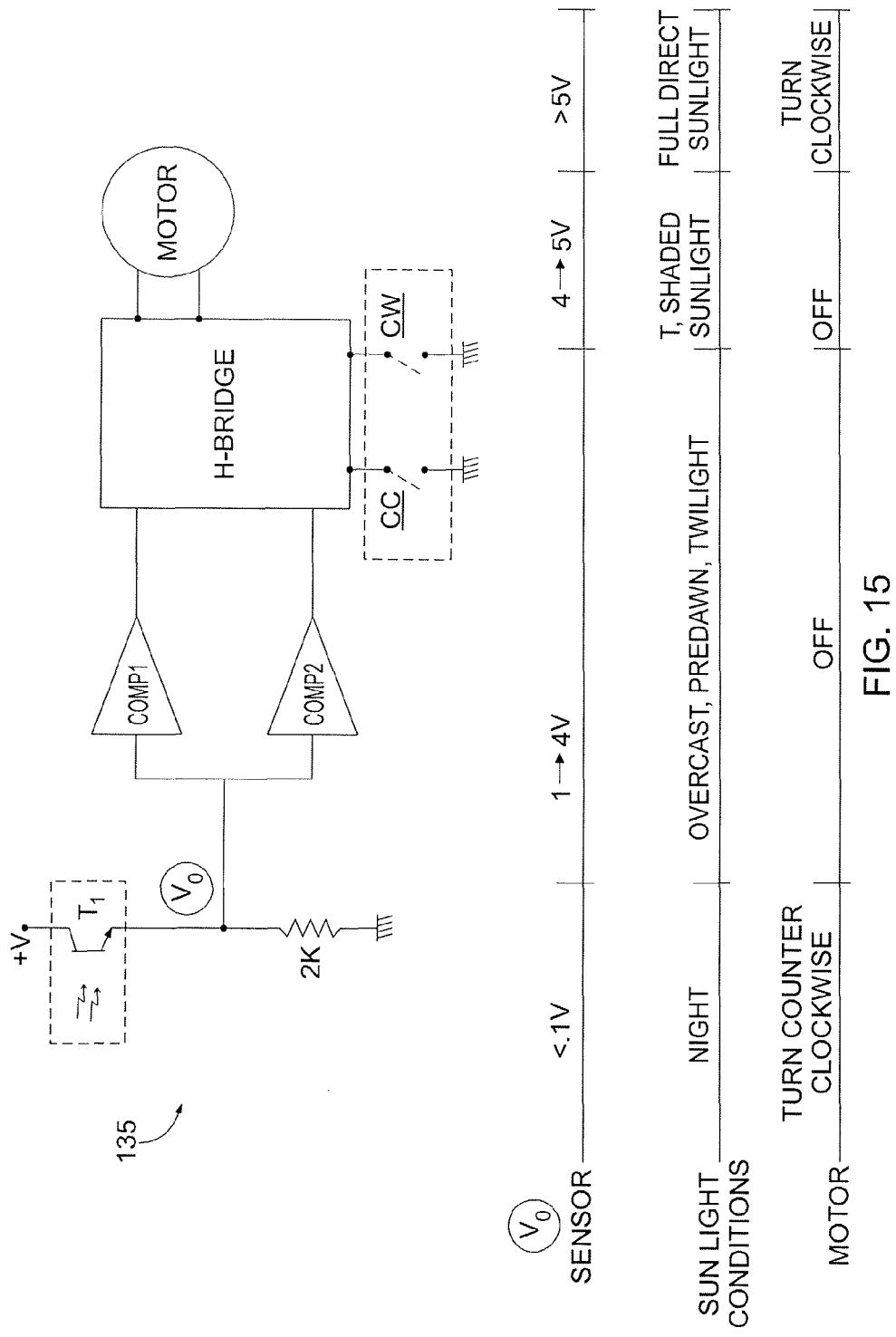
FIG. 15 is a schematic representation of another embodiment of an electric circuit which communicates between the orientation sensor assembly and the rotating assembly of the sun-tracking device useful with another embodiment of the invention, such as the equatorial solar energy system shown in FIGS. 22 and 23.
Figure 16:
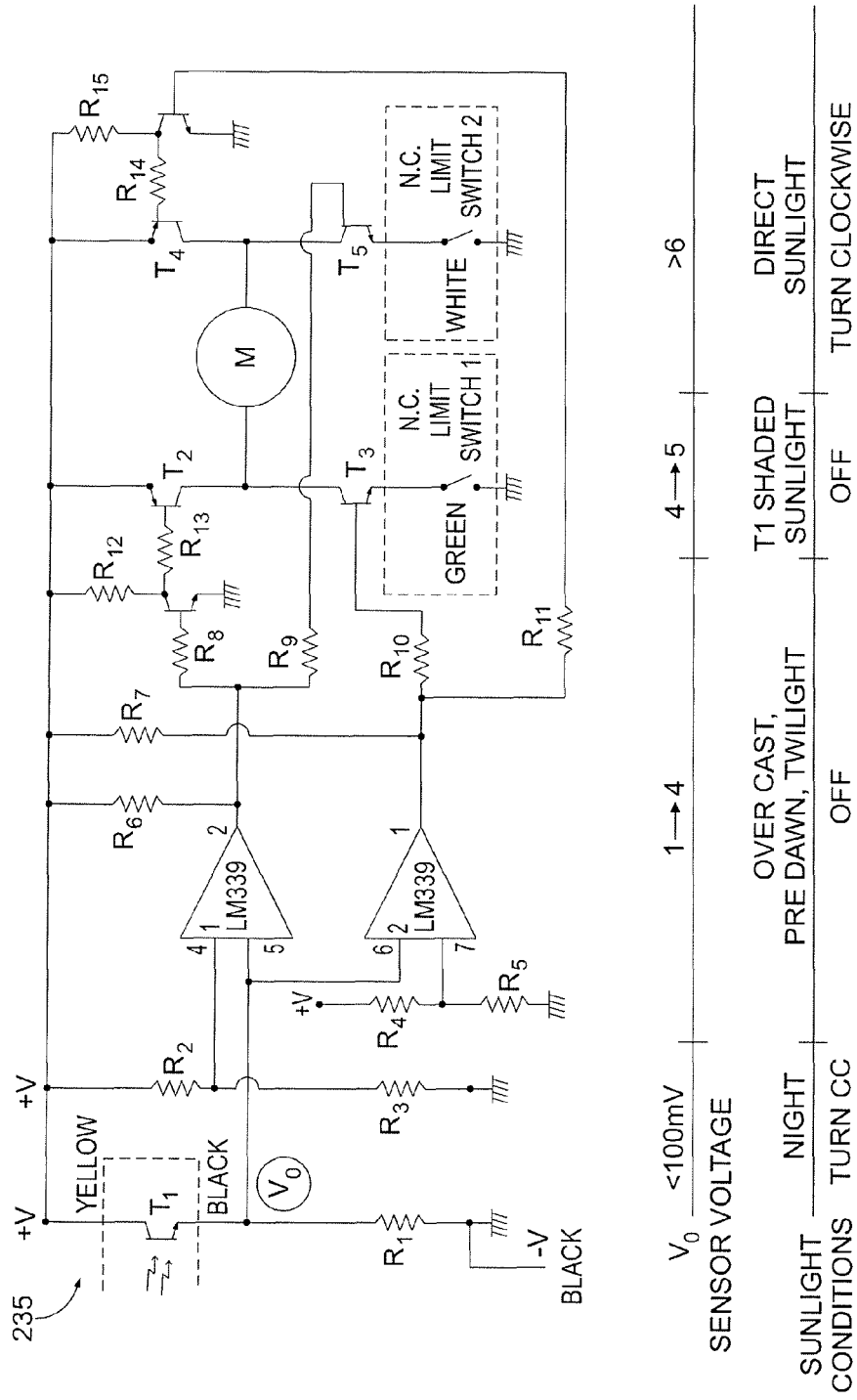
FIG. 16 is a schematic representation of a more detailed version of the electric circuit shown in FIG. 15.

FIGS. 15 and 16 each illustrate the operating schemes of exemplary electric circuits 135, 235 suitable for use with the embodiment of the orientation sensor assembly 127 shown in FIGS. 13A and 13B. The electric circuit 235 shown in FIG. 16 is intended to be a more detailed version of the electric circuit 135 shown in FIG. 15. In operation, the photovoltaic sensor 131 (see FIGS. 13A and 13B) produces an output voltage V(O) which varies according to the amount of solar energy received from sunlight. The range of possible output voltages is shown on the V(O) scale shown in each of FIGS. 15 and 16.

Further, in each of FIGS. 15 and 16, below the V(O) scale is the scale of sunlight conditions, which progresses from night, thru overcast, predawn, and twilight circumstances, to a shaded sunlight condition, and concluding with the direct sunlight condition. When V(0) is less than 0.1 volt, the output of Comp2 is true, causing the motor 26 to rotate the carriage assembly 15 (see, e.g., FIGS. 1 and 9) in a counterclockwise (CC) direction until a limit switch opens as actuated by a pin fixed to the gear drive (not shown per se). This is the due east position for the carriage assembly 15 and photovoltaic devices supported on the carriage assembly 15. The carriage assembly 15 and orientation sensor assembly 127 remain in the due east position until the photovoltaic sensor 131 receives full direct sunlight (see FIG. 14A) whereupon the output voltage rises to a value equal to or greater than a predetermined value. By "predetermined" is meant determined beforehand, so that the predetermined value must be determined, i.e., chosen or at least known, in advance of some event. Persons having ordinary skill in the relevant art will readily understand and be able to select a suitable determined value for comparison to the output voltage based on the particular location and nature of the solar energy system 11.

Direct sunlight provides Comp 1 sufficient voltage to be "true," causing the H-Bridge to drive the motor clockwise until the photovoltaic sensor 131 is shaded (see FIG. 14B). As the sun progresses across the sky, changing its azimuth position, full direct sunlight impinging on the photovoltaic sensor 131 causes the output voltage to rise to equal to or greater than the predetermined value which, in turn, causes the electric circuit 135 to signal the motor 26 to rotate the carriage assembly 15 in a clockwise (CW) direction until the photovoltaic sensor 131 is entirely shaded. Overcast conditions will not provide enough sunlight and solar energy to cause the electric circuit 135 to engage the rotation assembly 23 to rotate the carriage assembly 15 and photovoltaic devices supported on the carriage assembly 15. This prevents false movements during atmospheric turbulence. The orientation sensor assembly 27 and rotation assembly 23 cooperate as described above to rotate the carriage assembly 15 and the photovoltaic devices supported on the carriage assembly 15 to follow the sun until sundown. The clockwise limit switch provides for shut-off of the motor 26 if the range of motion of the rotation assembly 23 is exceeded. When night returns a voltage of less than 0.1 volt, Comp2 turns true," which signals the rotation assembly 23 to turn counterclockwise until the limit switch CC is opened.

In summary, during normal operation of the solar energy system 11, for embodiments in which the orientation sensor assembly 127 comprises a planar shade structure 53 and a photovoltaic sensor 131 affixed to the bottom surface of the planar shade structure 131, the circuit 135 interprets the output voltage of the photovoltaic sensor 131, which varies with sunlight conditions, and then signals the motor 26 to engage the gear drive 25 (not shown in FIGS. 13A, 13B, 14A and 14B, but see, e.g., FIGS. 2 and 4) to align the carriage assembly 15 relative to the azimuth position of the sun by rotating the carriage assembly 15 according to the following predefined sets of conditions and conclusions.

When the output voltage from the photovoltaic sensor 131 falls to a value less than 0.1 volt, the electric circuit 135 signals the motor 26 to engage the gear drive 25 and rotate the carriage assembly 15 in a counterclockwise direction until the carriage assembly 15 is in its due east position (Set 7). This will occur at nightfall when the amount of sunlight falls below daylight levels, such as after dusk.

When the output voltage from the photovoltaic sensor 131 is equal to or greater than a predetermined daylight value, the electric circuit 135 signals the motor 26 to engage the gear drive 25 and rotate the carriage assembly 15 in a clockwise direction until the output voltage falls below the predetermined daylight value (Set 8). This will occur when the sun rises on a clear or only partly cloudy day and will continue throughout the day as the carriage assembly 15 is rotated to follow the sun's movement across the sky (Set 8).

As already shown in FIGS. 1, 2, and 9, the solar energy system 11 according to the present invention may also comprise one or more reflecting panels 21a, 21b, 21c affixed to the support structure 15b of the carriage assembly 15. The reflecting panels 21a, 21b, 21c and their placement on the solar energy system 11 are more clearly shown in simplified FIG. 17, which eliminates all other components except the support structure 15b of the carriage assembly 15, the photovoltaic devices 19a, 19b supported on the carriage assembly 15, and the reflecting panels 21a, 21b, 21c. As shown, each of the two photovoltaic devices 19a, 19b has a sunlight-collecting surface 20a, 20b, respectively. Together, the sunlight-collecting surfaces 20a, 20b define a total sunlight collecting area having a periphery 22 inside of which sunlight impinges the sunlight-collecting surfaces and outside of which sunlight does not impinge the sunlight-collecting surfaces in the absence of reflection.

As shown most clearly in FIGS. 17 and 19, the reflecting panels 21a, 21b, 21c are affixed to the support structure 15b proximate to the periphery 22 of the sunlight-collecting area. Thus, the reflecting panels 21a, 21b, 21c reflect sunlight from outside the periphery 22 to impinge on the sunlight-collecting surfaces 20a, 20b, without interfering with sunlight already directly impinging on the sunlight-collecting area. The reflecting panels 21a, 21b, 21c may each be adjustably attached to the support structure 15b so that their angles relative to the sunlight-collecting surfaces 20a, 20b may be adjusted to maximize the amount of sunlight each reflects onto the sunlight-collecting surfaces 20a, 20b. Furthermore, additional reflecting panels may be used and attached to the support structure 15b as determinable by persons of ordinary skill in the art.

FIGS. 18-20 provide schematic side, front, and bottom views, respectively, of the apparatus of FIG. 17 to show how sunlight directly impinges on the photovoltaic devices 19a, 19b and how additional sunlight is reflected by the reflector panels 21a, 21b, 21c to impinge on the photovoltaic devices 19a, 19b within the periphery 22 of the sunlight-collecting area. More particularly, FIG. 18 shows schematically how sunlight directly impinges on the photovoltaic devices 19a, 19b. FIG. 19 provides a schematic front view of the components shown in FIG. 18, looking from the line B-B of FIG. 18 and looking in the direction of the arrows. Similarly, FIG. 20 provides a schematic bottom view of the components shown in FIGS. 18 and 19, looking from line C of FIG. 18 and in the direction of the arrows. FIG. 20 also shows how sunlight which falls outside the periphery 22 (see also FIG. 19) is reflected by the reflector panels 21a, 21c (reflector panel 21b is not shown in FIG. 20) to impinge on the photovoltaic devices 19a, 19b within the periphery 22, thereby increasing the amount of sunlight and solar energy collected by the photovoltaic devices 19a, 19b.

Figure 21:
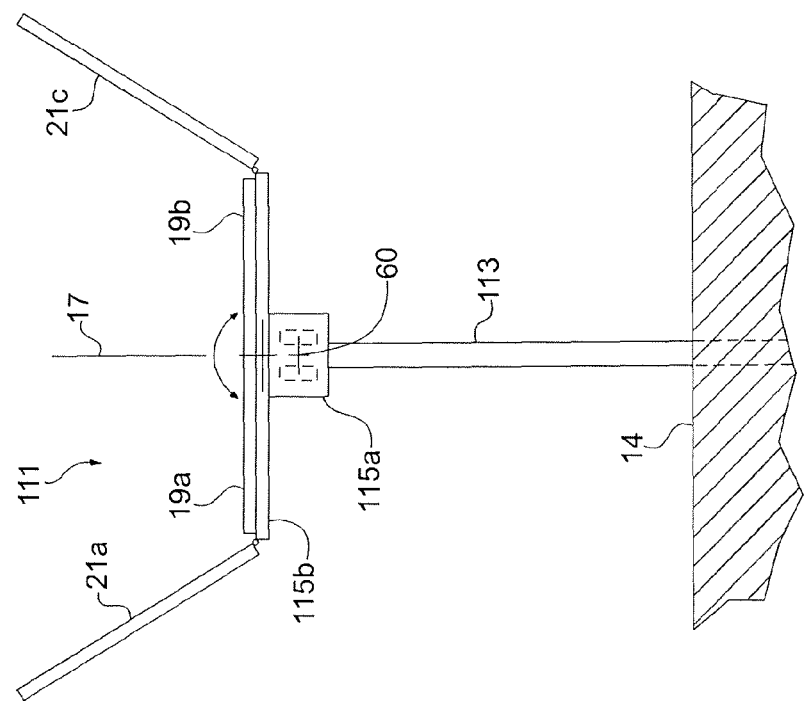
FIG. 21 illustrates another embodiment of the invention adapted for use in equatorial latitudes.

In still another embodiment of the present invention shown in FIG. 21, an equatorial solar energy system 111 is adapted such that the photovoltaic devices 19a, 19b are oriented to face the sun as the location of the sun changes across the sky at equatorial latitudes of the earth. The equatorial solar energy system 111 is supported by a base, such as a vertical pole 113, which connects to a pivotable carriage base 115a and a support structure 115b. The pivotable carriage base 115a pivots about a pivot axis 60 in a direction shown by arrow R, by operation of a gear device (not shown per se), such as that described above in connection with other embodiments. For example, in a particular embodiment, the gear device comprises a worm gear drive as described above having a toothed gear and a threaded worm screw (not shown). This pivot and gear arrangement provides the ability to tilt the support structure 115b, having the photovoltaic devices 19a, 19b and the reflector panels 21a, 21c on the support structure 115b, away from the zenith with the sun as it travels overhead in the more equatorial latitudes of the earth. The support structure 115b rotates relative to the pivot axis 60, and its rotation is driven and controlled by a gear device, such as described above. This pivoting motion is electrically controlled by a sun-tracking device as described above and having an orientation sensor assembly, rotation assembly, and an electric circuit, such as those also described above.

Figure 22:
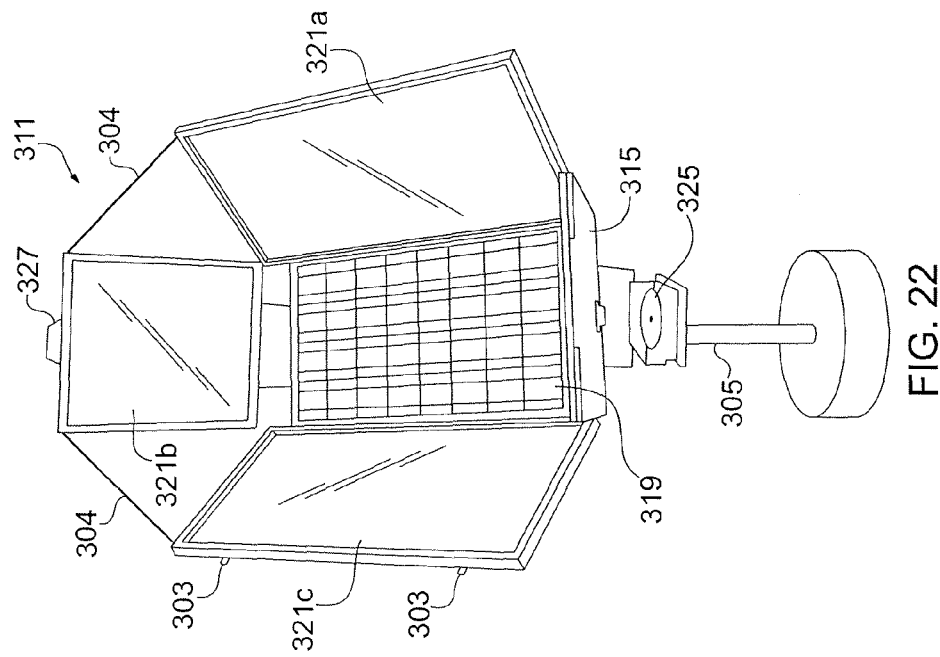
FIG. 22 illustrates still another embodiment of the invention having a base assembly comprising a vertical pole and in which the carriage assembly includes a rocker frame and a cradle rotatable in the rocker frame.
Figure 23:
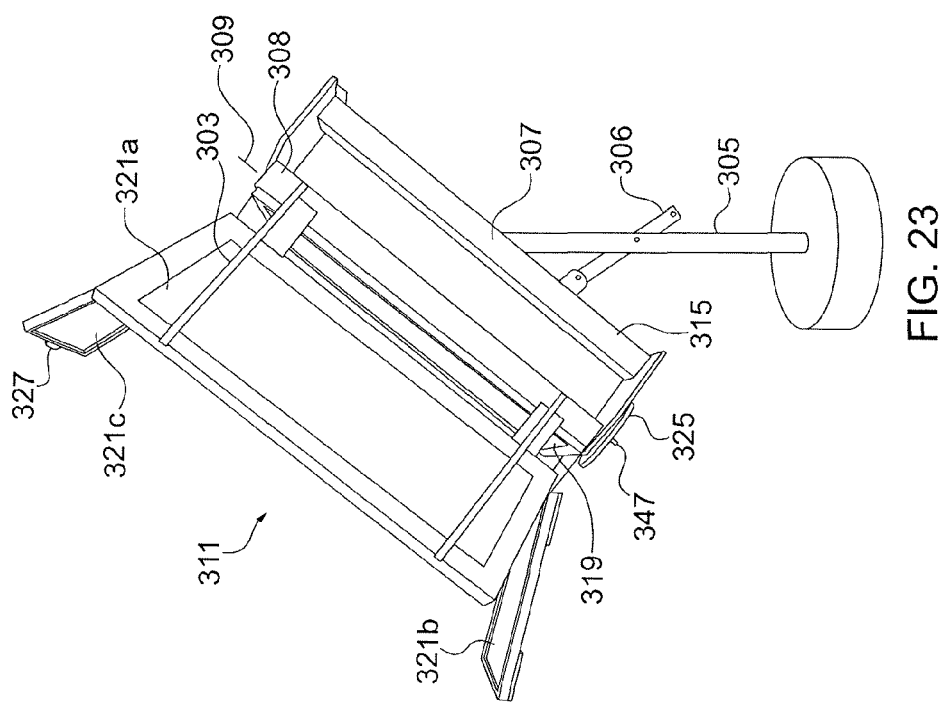
FIG. 23 is a side perspective view of the invention shown in FIG. 22.

FIGS. 22 and 23 show a front perspective view and a side view, respectively, of another embodiment of the solar energy system 311. The base assembly comprises a vertical pole 305 which rotatably supports the carriage assembly which, in turn, comprises a rocker frame 315 (i.e., carriage base structure) and a cradle 308 (i.e., support structure) which is at least partially rotatably connected to the rocker frame 315. More particularly, the vertical pole 305 supports the rocker frame 315 at its midpoint mounting point via a bolt 307. The rocker frame 315 is free to rotate at least partially (i.e., pivot) about its mounting bolt 307 so that the seasonal tilt may be manually adjusted by selecting the appropriate holes in the vertical pole 305 and the holes in a tilt strut 306. The cradle 308 is free to rotate partially (i.e., pivot) in the rocker frame 315 on two axles 309, 347, one a top axle 309 and one a bottom axle 347. Mounted in the middle of the cradle 308 is or are one or more photovoltaic panels 319. Reflector panels 321a, 321b, 321c, 321d are situated on each side of the photovoltaic panel 319, at an angle of 60 degrees to the plane of the photovoltaic panel 319. The side reflectors 321a, 321c are supported by struts 303 (see FIG. 23) and the top and bottom reflectors 321b, 321d are supported by struts 304 (see FIG. 22).

In the embodiment shown in FIGS. 22 and 23, the position of the cradle 308 is governed by (1) a gear drive 325 as described above, such as a worm gear drive; (2) an orientation sensor assembly 327 such as those described above and shown in FIGS. 10, 11, 13A, and 13B; and (3) a suitable electric circuit such as shown and described above with reference to FIGS. 15 and 16.

Figure 24:
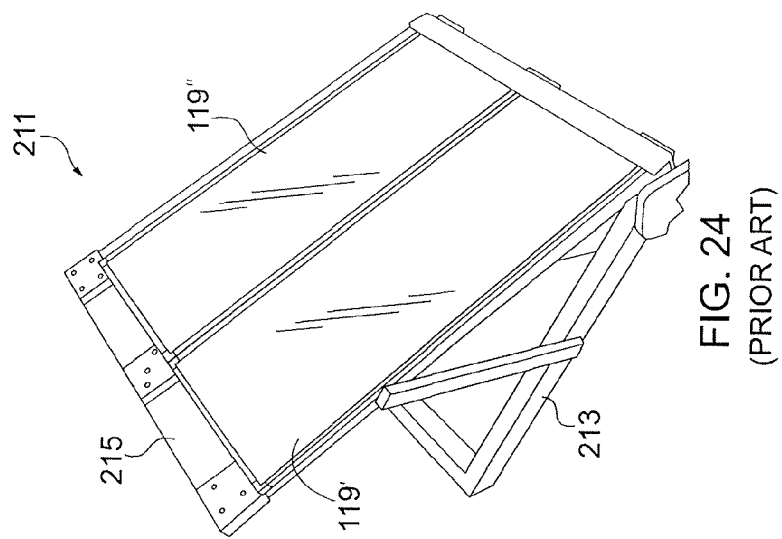
FIG. 24 is schematic perspective view of a prior art solar energy system which lacks a sun-tracking assembly and reflector panels.

For contrast, FIG. 24 shows a solar energy system 211 in accordance with the prior art where one or more photovoltaic devices 119', 119" are supported on a stationary support structure 215, which is attached to a base structure 213 for affixing the system to a substrate such as the ground or a roof, etc. The prior art system 211 lacks any components of the sun-tracking device of the present invention, such as an orientation sensor assembly for sensing the position of the sun, or a rotation assembly for rotating the support structure 215 relative to the base structure 213. The prior art system 211 also lacks any reflector panels for reflecting additional sunlight onto the photovoltaic devices 119', 119". Thus, the prior art system 211 clearly lacks features for following the sun throughout the day or reflecting additional sunlight onto to the photovoltaic devices 119', 119" and therefore fails to maximize or increase the solar energy collected by the system 211, as is accomplished by the solar energy system 11 according to the present invention.

Figure 25:
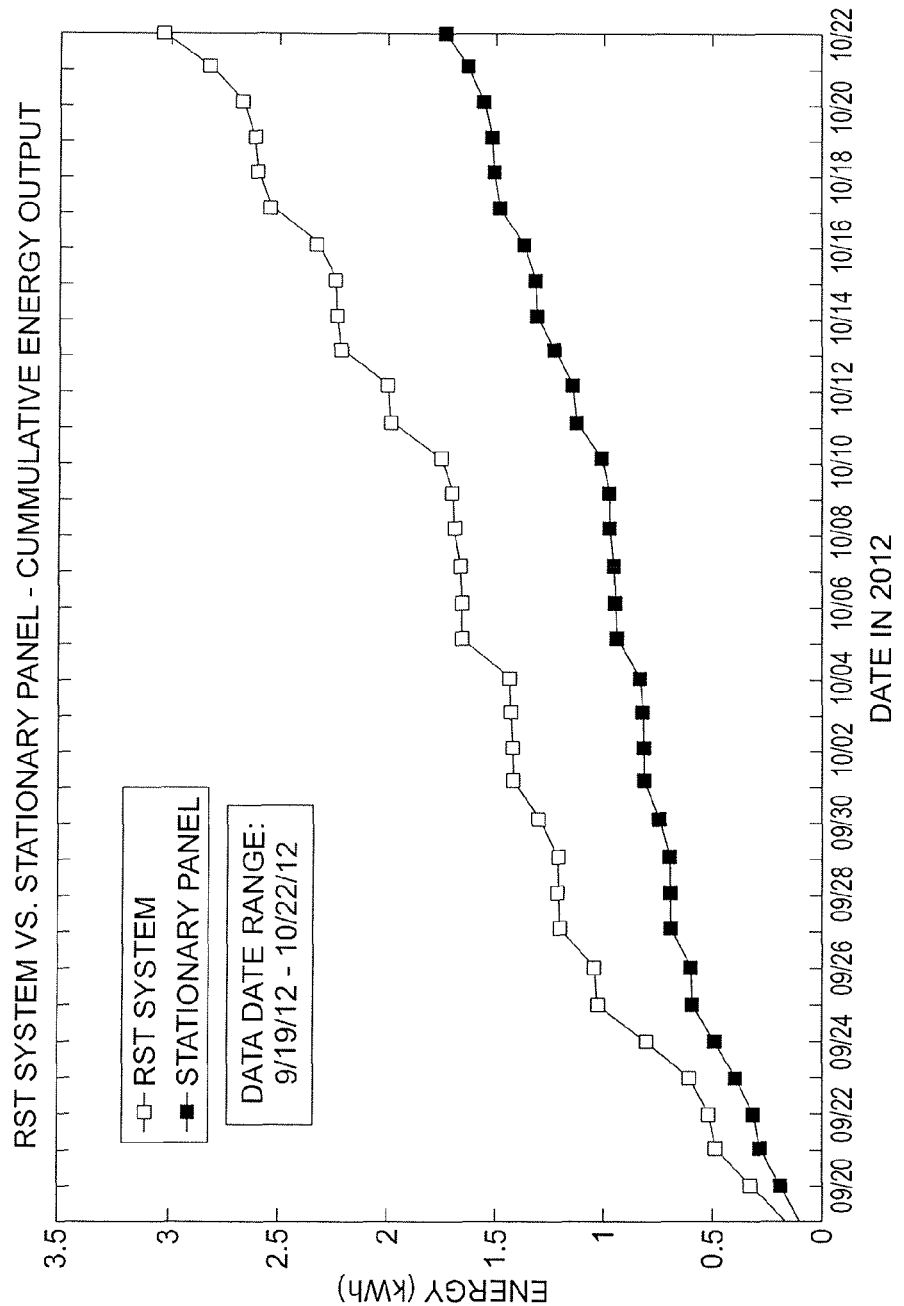
FIG. 25 is a line graph showing the performance of the invention as shown in FIGS. 1, 2, and 9 as compared to the performance of the prior art system of FIG. 24.
Figure 26:
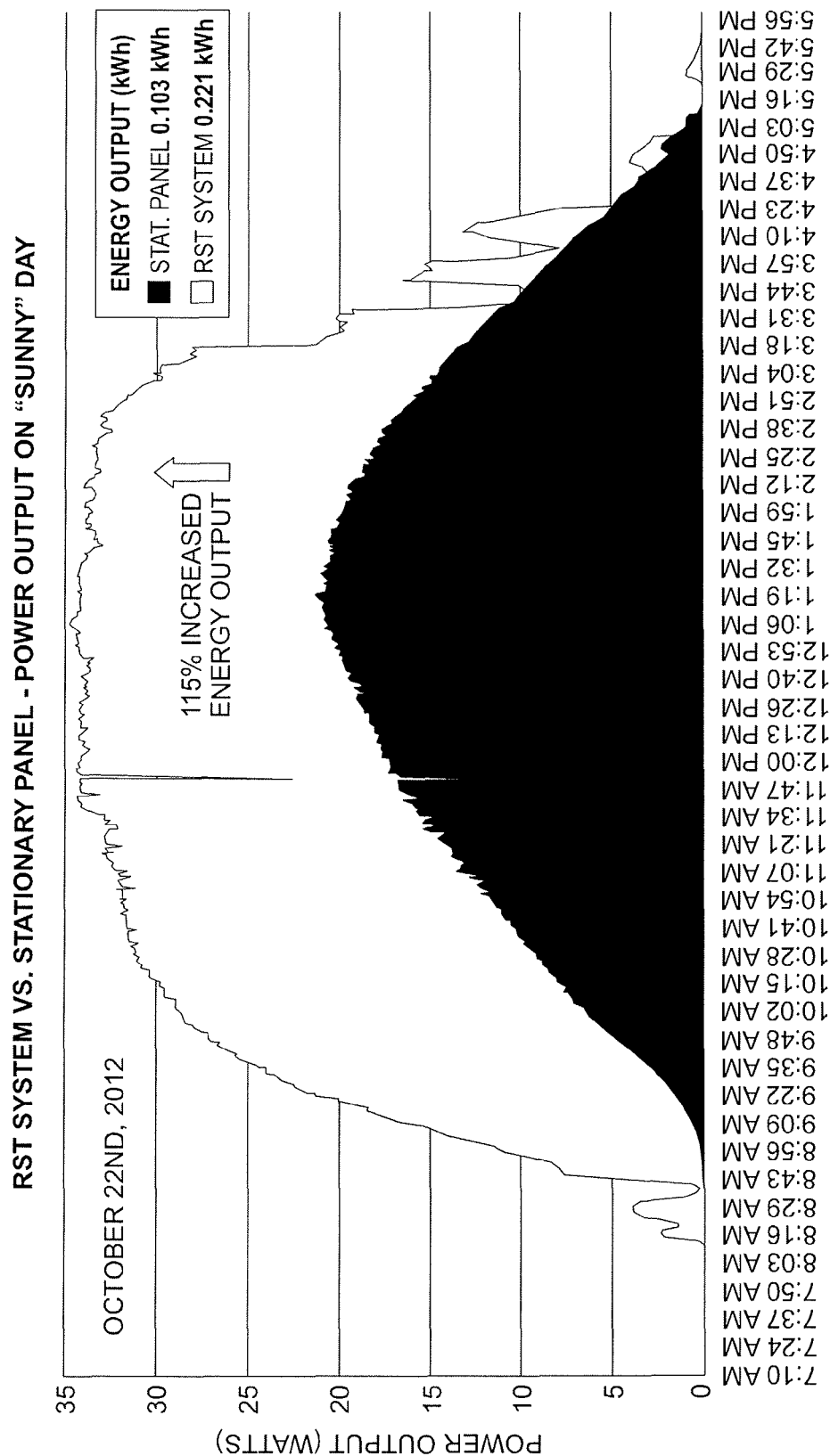
FIG. 26 is a histogram showing the performance of the invention as shown in FIGS. 1, 2, and 9 as compared to the performance of the prior art system of FIG. 24.
Figure 27:
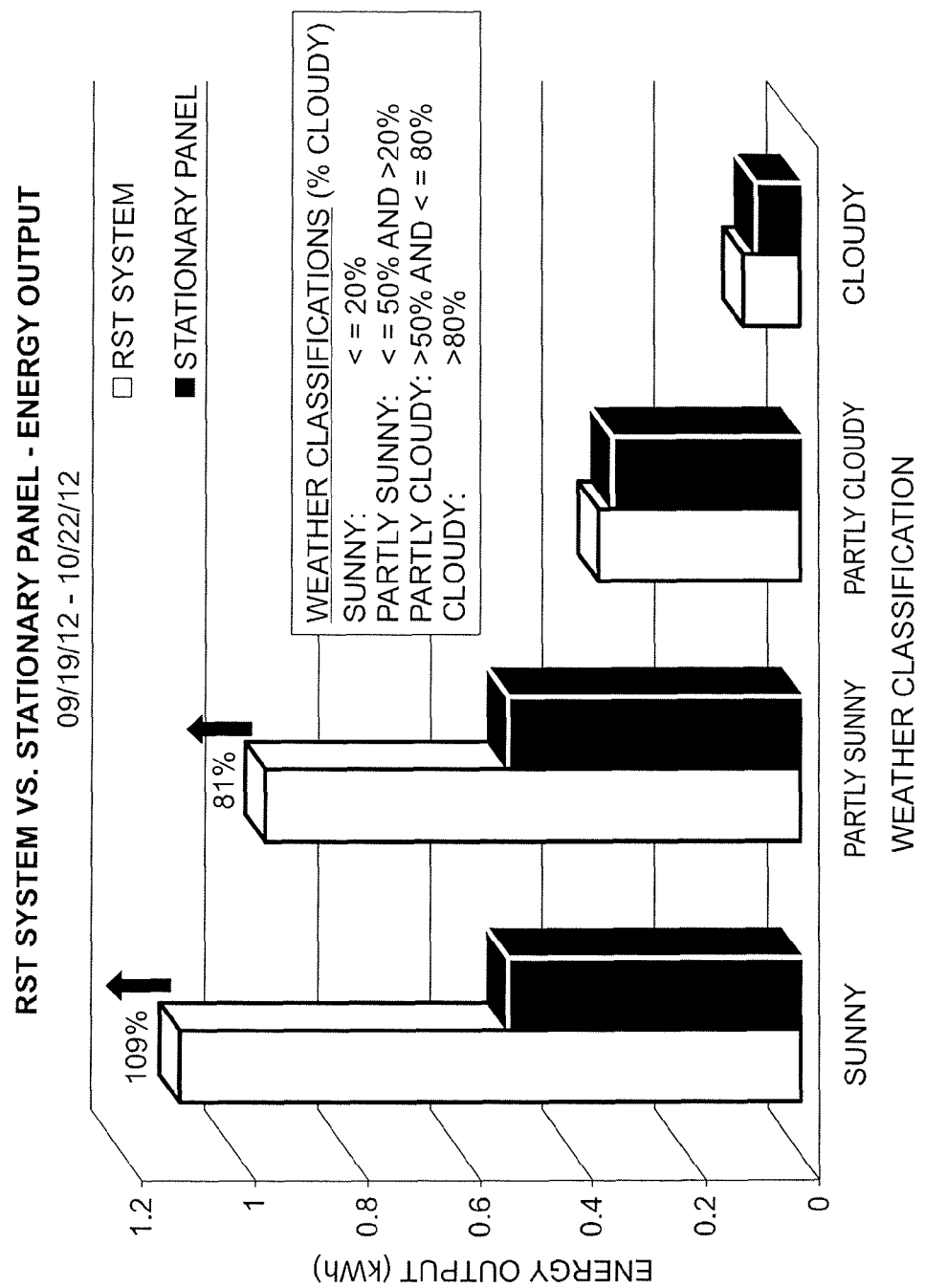
FIG. 27 is a bar graph showing the performance of the invention as shown in FIGS. 1, 2, and 9 as compared to the performance of the prior art system of FIG. 24.
Figure 28:
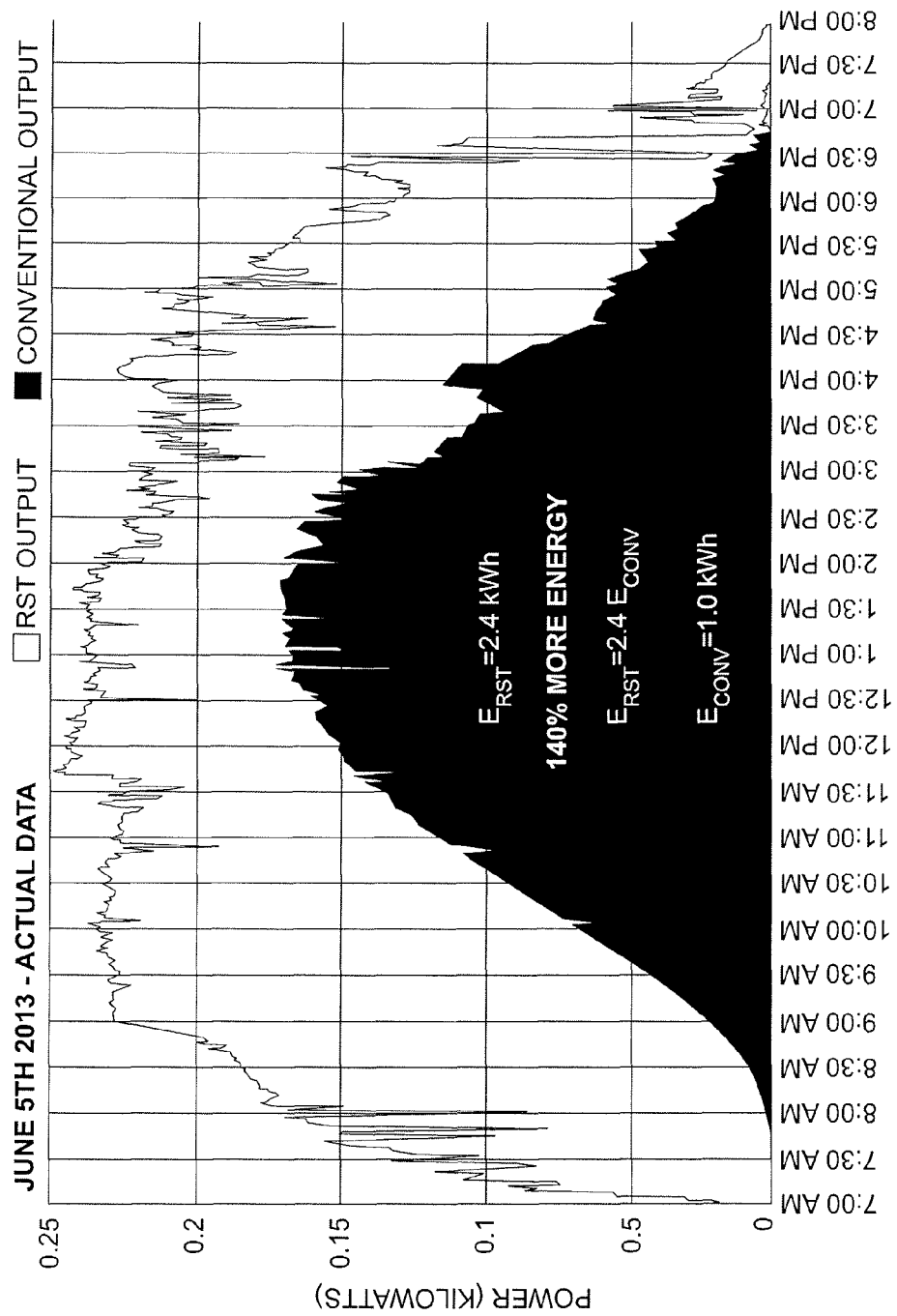
FIG. 28 is a histogram showing the performance of the invention as shown in FIGS. 21, 22, and 23 as compared to the performance of the prior art system of FIG. 24.

FIGS. 25-28 provide graphic data comparing the performance (electric energy produced) by the prior art system 211 of FIG. 24 with the performance (electric energy produced) by different embodiments of the solar energy system 11 according to the present invention. More particularly, FIG. 25 is a line graph showing the performance of the embodiment of the invention as shown in FIGS. 1, 2, and 9 as compared to the performance of the prior art system 211 of FIG. 24. FIG. 26 is a histogram showing the performance of the embodiment of the invention as shown in FIGS. 1, 2, and 9 as compared to the performance of the prior art system 211 of FIG. 24. FIG. 27 is a bar graph showing the performance of the embodiment of the invention as shown in FIGS. 1, 2, and 9 as compared to the performance of the prior art system 211 of FIG. 24. Lastly, FIG. 28 is a histogram showing the performance of the embodiment of the invention as shown in FIGS. 21, 22, and 23 as compared to the performance of the prior art system 211 of FIG. 24.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed:

1. A solar energy system for collecting solar energy from the sun and converting the solar energy to electricity, using one or more photovoltaic devices, each of which has a sunlight-collecting surface, and wherein the sun has a varying azimuth position between sunrise and sunset, the system comprising:
   (a) a base assembly adapted to be fixed to a substrate and having a vertical axis which extends through the base assembly and is normal to the base assembly;
   (b) a carriage assembly rotatably connected to the base assembly, wherein the carriage assembly is rotatable about the vertical axis to align the carriage assembly relative to the azimuth position of the sun, the carriage assembly including:
      (i) a carriage base structure rotatably attached to the base assembly, and
      (ii) a support structure attached to the carriage base structure and adapted to support the one or more photovoltaic devices; and
   (c) a sun-tracking device which senses the azimuth position of the sun and rotates the carriage assembly accordingly, the sun-tracking device including:
      (i) an orientation sensor assembly having one or more photovoltaic sensors, each of which receives solar energy from the sun and produces an output voltage based on the sun's azimuth position, and at least one planar feature which is positioned relative to the one or more photovoltaic sensors to at least partially expose or shade at least one of the photovoltaic sensors depending on the azimuth position of the sun, the at least one planar feature including:

(1) a planar table which is affixed to, and extends away from, the support structure of the carriage assembly and has a table surface, (2) a shade fin connected to the table surface of the planar table and extending away from the support structure at an angle substantially perpendicular to the table surface, and extending from a front point on the table surface nearest the support structure to a rear point on the table surface farthest from the support structure, whereby the shade fin divides the table surface into a west-most portion and an east-most portion, and (3) a return shade fin connected to and extending from the shade fin toward the west-most portion of the table surface and forming an L-shape with the shade fin and, when sunlight travels in a direction from the rear point to the front point, sunlight is prevented from impinging on the west-most table surface, wherein the one or more photovoltaic sensors comprise an east-most sensor positioned on the east-most portion of the table surface and a west-most sensor positioned on the west-most portion of the table surface and when sunlight approaches the orientation sensor assembly from an eastern direction, the west-most sensor is at least partly shaded by the shade fin and when sunlight approaches the orientation sensor assembly from a western direction, the east-most sensor is at least partly shaded by the shade fin, (ii) a rotation assembly affixed to the base assembly and having a motor and a gear drive in communication with both the motor and the carriage base structure of the carriage assembly, and (iii) an electric circuit which receives the output voltage from each of the one or more photovoltaic sensors, interprets each output voltage according to a predefined set of conditions and conclusions and, based on the conditions and conclusions, signals the motor to engage the gear drive and rotate the carriage assembly in a first direction or a second direction, or neither direction, thereby aligning the carriage assembly relative to the azimuth position of the sun.

2. The system according to claim 1, wherein the sunlight-collecting surfaces of the one or more photovoltaic devices define a sunlight collecting area having a periphery inside of which sunlight impinges the sunlight-collecting surfaces and outside of which sunlight does not impinge the sunlight-collecting surfaces in the absence of reflection, the system further comprising one or more reflecting panels affixed to the support structure of the carriage assembly proximate to the periphery of the sunlight-collecting area, wherein the reflecting panels reflect sunlight from outside the periphery to impinge on the sunlight-collecting surfaces without interfering with sunlight impinging on the sunlight-collecting area.

3. The system according to claim 1, wherein the gear drive of the rotation assembly of the sun-tracking device comprises a worm gear drive.

4. The system according to claim 3, wherein the worm gear drive comprises:

a disk-shaped toothed gear which is positioned concentrically with the vertical axis of the base assembly; and a threaded worm screw which is engaged with the toothed gear, wherein the toothed gear is connected to both the base assembly and the carriage base structure of the carriage assembly, and the threaded worm screw is in communication with, and rotatable by, the motor of the rotation assembly.

5. The system according to claim 1, wherein the orientation sensor assembly of the sun-tracking device is attached directly or indirectly to the carriage assembly such that the orientation sensor assembly remains in the same orientation as the carriage assembly with respect to the azimuth position of the sun and sunlight reaches the orientation sensor assembly without interference other than from the at least one planar feature.

6. The system according to claim 1, wherein the electric circuit interprets the output voltages of the east-most and west-most photovoltaic sensors and then signals the motor to engage the gear drive to align the carriage assembly relative to the azimuth position of the sun by rotating the carriage assembly, wherein:

when the output voltage from the east-most sensor is less than the output voltage from the west-most sensor, the electric circuit signals the motor to engage the gear drive and rotate the carriage assembly in a first direction thereby aligning the carriage assembly relative to the azimuth position of the sun;

when the output voltage from the west-most sensor is less than the output voltage from the east-most sensor, the electric circuit signals the motor to engage the gear drive and rotate the carriage assembly in a second direction, which is opposite the first direction; and when the output voltage from the east-most sensor is substantially equal to the output voltage from the west-most sensor, the electric circuit does not signal the motor to engage the gear drive, whereby the carriage assembly is not rotated.

7. The system according to claim 1, wherein the one or more photovoltaic sensors further comprise a reference sensor which is positioned in a location where the sunlight impinges on the reference sensor free from interference by the planar table or any other feature of the system, and wherein the electric circuit interprets the output voltages of the east-most, west-most, and reference sensors and then signals the motor to engage the gear drive to align the carriage assembly relative to the azimuth position of the sun by rotating the carriage assembly, wherein:

when the output voltage from the east-most sensor is less than the output voltage from the reference sensor, the electric circuit signals the motor to engage the gear drive and rotate the carriage assembly in a first direction thereby aligning the carriage assembly relative to the azimuth position of the sun;

when the output voltage from the west-most sensor is less than the output voltage from the reference sensor, the electric circuit signals the motor to engage the gear drive and rotate the carriage assembly in a second direction, which is opposite the first direction; and when the output voltage from either the east-most sensor or the west-most sensor are substantially equal to the output voltage from the reference sensor, the electric circuit does not signal the motor to engage the gear drive.

8. The system according to claim 1, wherein the orientation sensor assembly of the sun-tracking device further comprises an adjustable mounting tab which adjustably attaches the orientation sensor assembly to the carriage assembly.

9. The system according to claim 1, wherein
(a) the base assembly comprises a vertical pole;
(b) the carriage base of the carriage assembly comprises a rocker frame having a midpoint at which the rocker frame is pivotably connected with a mounting bolt to the vertical pole, and the support structure of the carriage assembly comprises a cradle which is at least partially rotatably connected to the rocker frame at both a top axle and a bottom axle; and
(c) the sun-tracking device rotates the cradle using the rotation assembly based on signals from the electric circuit which receives and interprets output voltage from the photovoltaic sensors of the orientation sensor assembly.

10. A solar energy system for collecting solar energy from the sun and converting the solar energy to electricity, using one or more photovoltaic devices, each of which has a sunlight-collecting surface, wherein the sunlight-collecting surfaces of the one or more photovoltaic devices define a sunlight collecting area having a periphery inside of which sunlight impinges the sunlight-collecting surfaces and outside of which sunlight does not impinge the sunlight-collecting surfaces in the absence of reflection, and wherein the sun has a varying azimuth position between sunrise and sunset, the system comprising:
(a) a base assembly adapted to be fixed to a substrate and having a vertical axis which extends through the base assembly and is normal to the base assembly;
(b) a carriage assembly rotatably connected to the base assembly, wherein the carriage assembly is rotatable about the vertical axis to align the carriage assembly relative to the azimuth position of the sun, the carriage assembly including:
  (i) a carriage base structure rotatably attached to the base assembly, and
  (ii) a support structure attached to the carriage base structure and adapted to support the one or more photovoltaic devices;
(c) a sun-tracking device which senses the azimuth position of the sun and rotates the carriage assembly accordingly, the sun-tracking device including:
  (i) an orientation sensor assembly having one or more photovoltaic sensors, each of which receives solar energy from the sun and produces an output voltage based on the sun's azimuth position, and at least one planar feature which is positioned relative to the one or more photovoltaic sensors to at least partially expose or shade at least one of the photovoltaic sensors depending on the azimuth position of the sun,
  wherein the orientation sensor assembly of the sun-tracking device is attached directly or indirectly to the carriage assembly such that the orientation sensor assembly remains in the same orientation as the carriage assembly with respect to the azimuth position of the sun and sunlight reaches the orientation sensor assembly without interference other than from the at least one planar feature, the at least one planar feature including:
    (1) a planar table which is affixed to, and extends away from, the support structure of the carriage assembly and has a table surface,
    (2) a shade fin connected to the table surface of the planar table and extending away from the support structure at an angle substantially perpendicular to the table surface, and extending from a front point on the table surface nearest the support structure to a rear point on the table surface farthest from the support structure, whereby the shade fin divides the table surface into a west-most portion and an east-most portion, and
    (3) a return shade fin connected to and extending from the shade fin toward the west-most portion of the table surface and forming an L-shape with the shade fin and, when sunlight travels in a direction from the rear point to the front point, sunlight is prevented from impinging on the west-most table surface,
  wherein the one or more photovoltaic sensors comprise an east-most sensor positioned on the east-most portion of the table surface and a west-most sensor positioned on the west-most portion of the table surface and when sunlight approaches the orientation sensor assembly from an eastern direction, the west-most sensor is at least partly shaded by the shade fin and when sunlight approaches the orientation sensor assembly from a western direction, the east-most sensor is at least partly shaded by the shade fin,
  (ii) a rotation assembly affixed to the base assembly and having a motor and a worm gear drive in communication with both the motor and the carriage base structure of the carriage assembly, and
  (iii) an electric circuit which receives the output voltage from each of the one or more photovoltaic sensors, interprets each output voltage according to a predefined set of conditions and conclusions and, based on the conditions and conclusions, signals the motor to engage the gear drive and rotate the carriage assembly in a first direction or a second direction, or neither direction, thereby aligning the carriage assembly relative to the azimuth position of the sun, and
(d) one or more reflecting panels affixed to the support structure of the carriage assembly proximate to the periphery of the sunlight-collecting area, wherein the reflecting panels reflect sunlight from outside the periphery to impinge on the sunlight-collecting surfaces without interfering with sunlight impinging on the sunlight-collecting area.

11. The system according to claim 10, wherein the electric circuit interprets the output voltages of the east-most and west-most sensors and then signals the motor to engage the gear drive to align the carriage assembly relative to the azimuth position of the sun by rotating the carriage assembly according to the following predefined sets of conditions and conclusions:
  when the output voltage from the east-most sensor is less than the output voltage from the west-most sensor, the electric circuit signals the motor to engage the gear drive and rotate the carriage assembly in a first direction thereby aligning the carriage assembly relative to the azimuth position of the sun;
  when the output voltage from the west-most sensor is less than the output voltage from the east-most sensor, the electric circuit signals the motor to engage the gear drive and rotate the carriage assembly in a second direction, which is opposite the first direction; and
  when the output voltage from the east-most sensor is substantially equal to the output voltage from the west-most sensor, the electric circuit does not signal the motor to engage the gear drive, whereby the carriage assembly is not rotated.

12. The system according to claim 10, wherein the one or more photovoltaic sensors further comprise a reference sensor which is positioned in a location where the sunlight impinges on the reference sensor free from interference by the planar members or any other feature of the system, and wherein the electric circuit interprets the output voltages of the east-most, west-most, and reference sensors and then signals the motor to engage the gear drive to align the carriage assembly relative to the azimuth position of the sun by rotating the carriage assembly according to the following predefined sets of conditions and conclusions:

when the output voltage from the east-most sensor is less than the output voltage from the reference sensor, then the sunlight is less intense on the east-most table surface portion relative to the west-most table surface portion and the electric circuit signals the motor to engage the gear drive and rotate the carriage assembly in a first direction thereby aligning the carriage assembly relative to the azimuth position of the sun;

when the output voltage from the west-most sensor is less than the output voltage from the reference sensor, then the sunlight is less intense on the west-most table surface portion relative to the east-most table surface portion and the electric circuit signals the motor to engage the gear drive and rotate the carriage assembly in a second direction, which is opposite the first direction; and when the output voltage from either the east-most sensor or the west-most sensor substantially equal to the output voltage from the reference sensor, then the sunlight is equally intense on the east-most and west-most table surface portions and the electric circuit does not signal the motor to engage the gear drive, whereby the carriage assembly is not rotated.

13. The system according to claim 10, wherein
(a) the base assembly comprises a vertical pole;
(b) the carriage base of the carriage assembly comprises a rocker frame having a midpoint at which the rocker frame is pivotably connected with a mounting bolt to the vertical pole, and the support structure of the carriage assembly comprises a cradle which is at least partially rotatably connected to the rocker frame at both a top axle and a bottom axle; and
(c) the sun-tracking device rotates the cradle using the rotation assembly based on signals from the electric circuit which receives and interprets output voltage from the photovoltaic sensors of the orientation sensor assembly.

14. A solar energy system for collecting solar energy from the sun and converting the solar energy to electricity, using one or more photovoltaic devices, each of which has a sunlight-collecting surface, wherein the sunlight-collecting surfaces of the one or more photovoltaic devices define a sunlight collecting area having a periphery inside of which sunlight impinges the sunlight-collecting surfaces and outside of which sunlight does not impinge the sunlight-collecting surfaces in the absence of reflection, and wherein the sun has a varying azimuth position between sunrise and sunset, the system comprising:

(a) a base assembly adapted to be fixed to a substrate and having a vertical axis which extends through the base assembly and is normal to the base assembly;
(b) a carriage assembly rotatably connected to the base assembly, wherein the carriage assembly is rotatable about the vertical axis to align the carriage assembly relative to the azimuth position of the sun, the carriage assembly including:
  (i) a carriage base structure rotatably attached to the base assembly, and
  (ii) a support structure attached to the carriage base structure and adapted to support the one or more photovoltaic devices;
(c) a sun-tracking device which senses the azimuth position of the sun and rotates the carriage assembly accordingly, the sun-tracking device including:
  (i) an orientation sensor assembly having one or more photovoltaic sensors, each of which receives solar energy from the sun and produces an output voltage based on the sun's azimuth position, and at least one planar feature which is positioned relative to the one or more photovoltaic sensors to at least partially expose or shade at least one of the photovoltaic sensors depending on the azimuth position of the sun, wherein the orientation sensor assembly of the sun-tracking device is attached directly or indirectly to the carriage assembly such that the orientation sensor assembly remains in the same orientation as the carriage assembly with respect to the azimuth position of the sun and sunlight reaches the orientation sensor assembly without interference other than from the at least one planar feature, wherein the orientation sensor assembly of the sun-tracking device (c) has a configuration wherein:
    (A) the at least one planar feature includes:
      (1) a planar table which is affixed to, and extends away from, the support structure of the carriage assembly and has a table surface,
      (2) a shade fin connected to the table surface of the planar table and extending from a front point on the table surface nearest the support structure and a rear point on the table surface farthest away from the support structure, whereby the shade fin divides the table surface into a west-most facing table surface portion and an east-most table surface portion, and
      (3) a return shade fin connected to and extending from the shade fin at the rear point and forming an L-shape with the shade fin and, when sunlight travels in a direction from the rear point to the front point, sunlight is prevented from impinging on the west-most facing table surface; and
    (B) the one or more photovoltaic sensors comprise an east-most sensor positioned on the east-most table surface portion and a west-most sensor positioned on the west-most table surface portion, and
    wherein when sunlight approaches the orientation sensor assembly from an eastern direction, the west-most sensor is at least partly shaded by the shade fin and when sunlight approaches the orientation sensor assembly from a western direction, the east-most sensor is at least partly shaded by the shade fin,
  (ii) a rotation assembly affixed to the base assembly and having a motor and a worm gear drive in communication with both the motor and the carriage base structure of the carriage assembly, wherein the worm gear drive comprises:
    a disk-shaped toothed gear which is positioned concentrically with the vertical axis of the base assembly; and
    a threaded worm screw which is engaged with the toothed gear, wherein the toothed gear is connected to both the base assembly and the carriage base structure of the carriage assembly, and the threaded worm screw is in communication with, and rotatable by, the motor of the rotation assembly; and (iii) an electric circuit which receives the output voltage from each of the one or more photovoltaic sensors, interprets the output voltages of the east-most and west-most photovoltaic sensors, and then signals the motor to engage the gear drive to align the carriage assembly relative to the azimuth position of the sun by rotating the carriage assembly, wherein:

when the output voltage from the east-most sensor is less than the output voltage from the west-most sensor the electric circuit signals the motor to engage the gear drive and rotate the carriage assembly in a first direction thereby aligning the carriage assembly relative to the azimuth position of the sun;

when the output voltage from the west-most sensor less than the output voltage from the east-most sensor, the electric circuit signals the motor to engage the gear drive and rotate the carriage assembly in a second direction, which is opposite the first direction; and when the output voltage from the east-most sensor is substantially equal to the output voltage from the west-most sensor, the electric circuit does not signal the motor to engage the gear drive, and (d) one or more reflecting panels affixed to the support structure of the carriage assembly proximate to the periphery of the sunlight-collecting area, wherein the reflecting panels reflect sunlight from outside the periphery to impinge on the sunlight-collecting surfaces without interfering with sunlight impinging on the sunlight-collecting area.

\* \* \* \* \*